April 3, 1962 L. A. DURANT 3,028,580
RECORD PLAYER AND SELECTING SYSTEM THEREFOR
Filed April 7, 1958 15 Sheets-Sheet 1
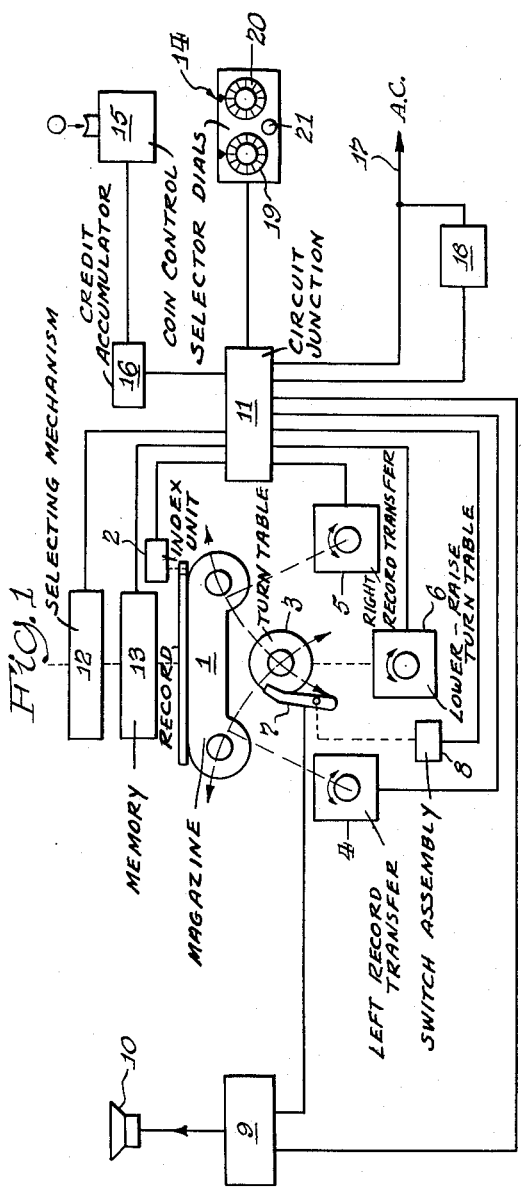
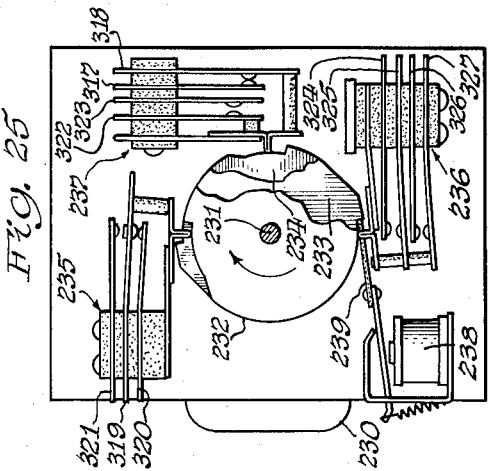
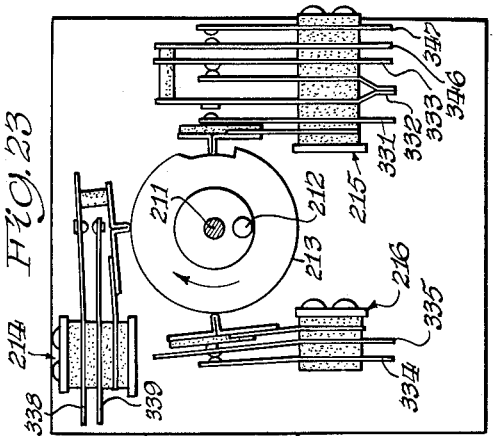
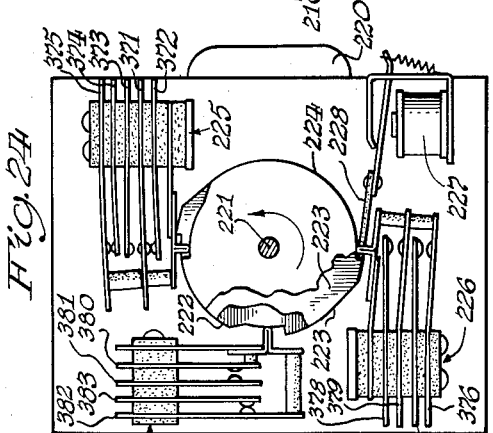
Inventor
Lyndon A. Durant April 3, 1962  L. A. DURANT  3,028,580
RECORD PLAYER AND SELECTING SYSTEM THEREFOR
Filed April 7, 1958  15 Sheets-Sheet 3
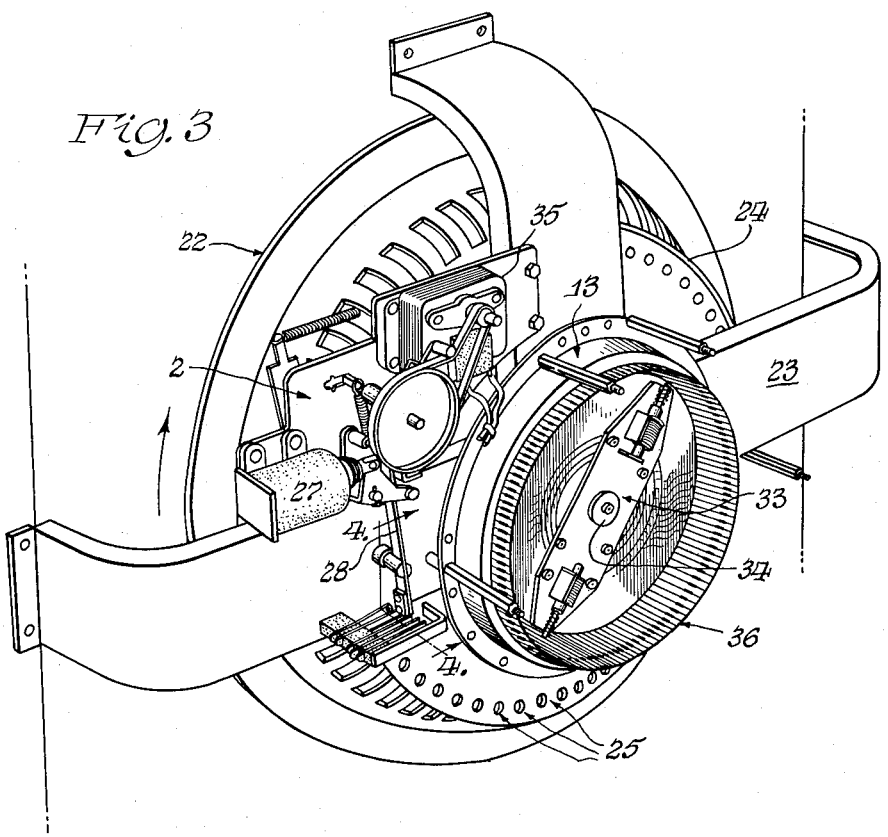
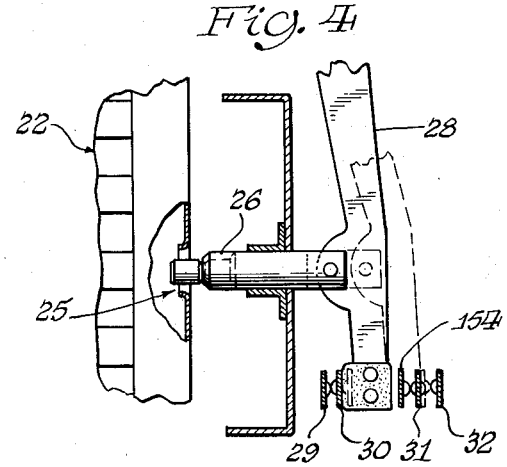
Inventor
Lyndon A. Durant
By Lloyd J. Andrews

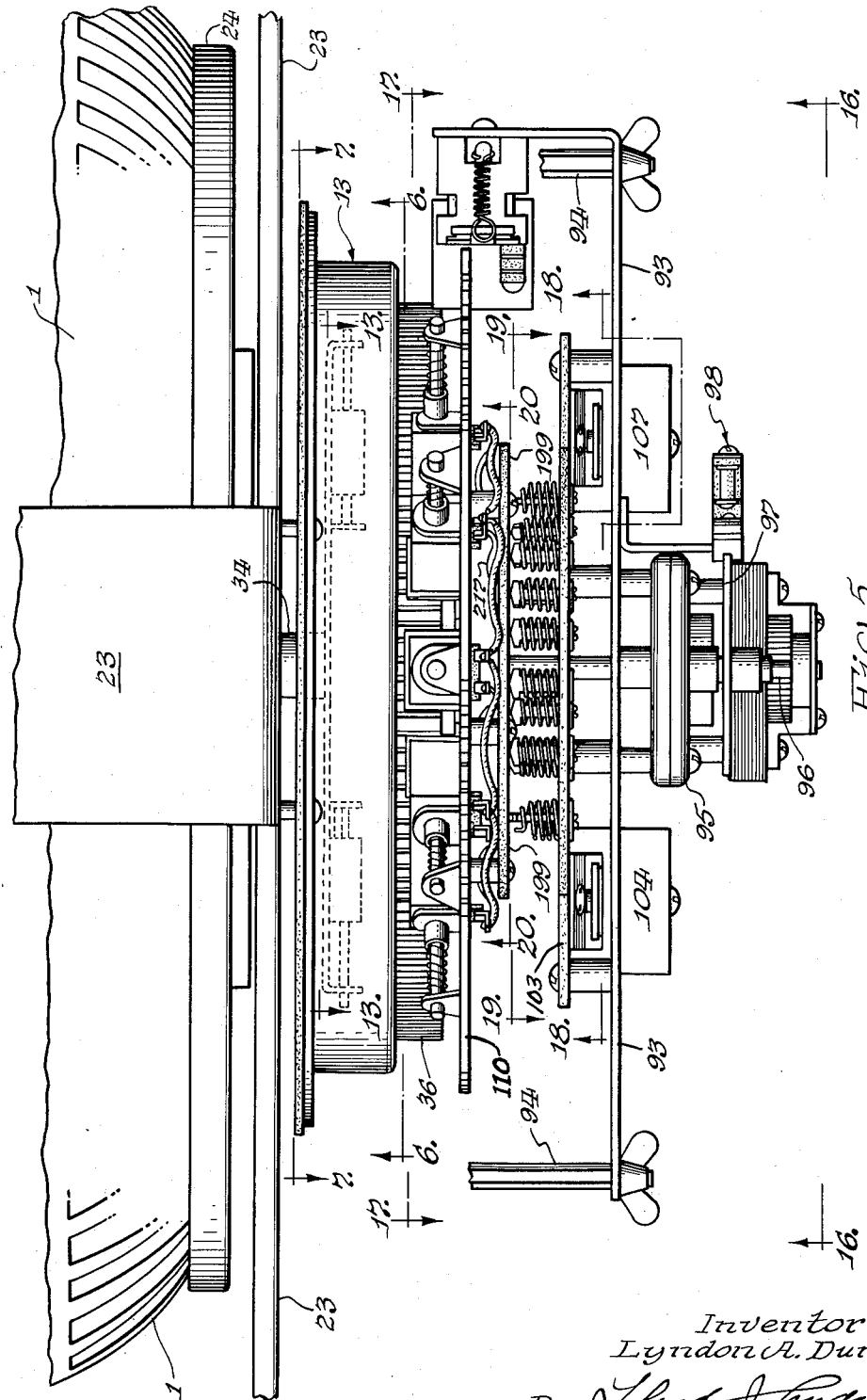

Inventor
Lyndon A. Durant

April 3, 1962 L. A. DURANT 3,028,580
RECORD PLAYER AND SELECTING SYSTEM THEREFOR
Filed April 7, 1958 15 Sheets-Sheet 6
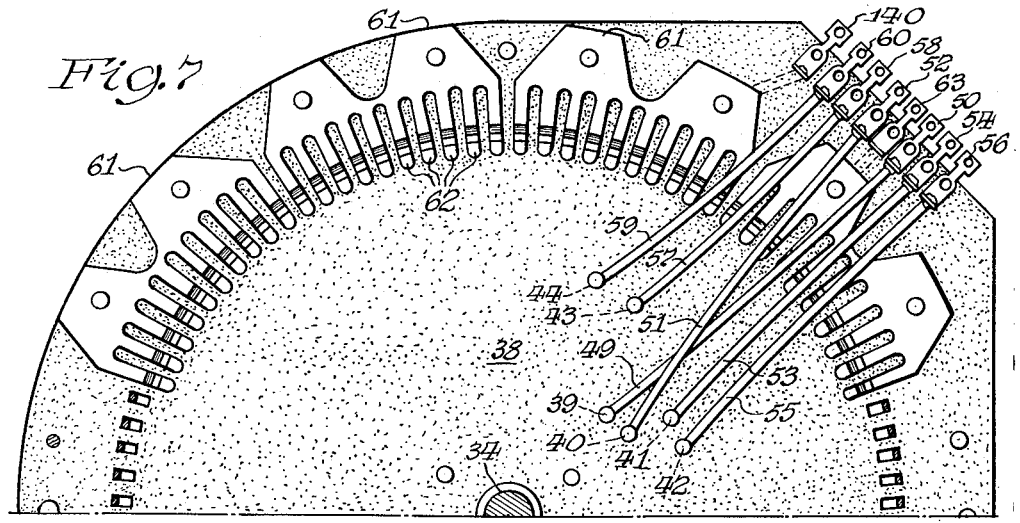
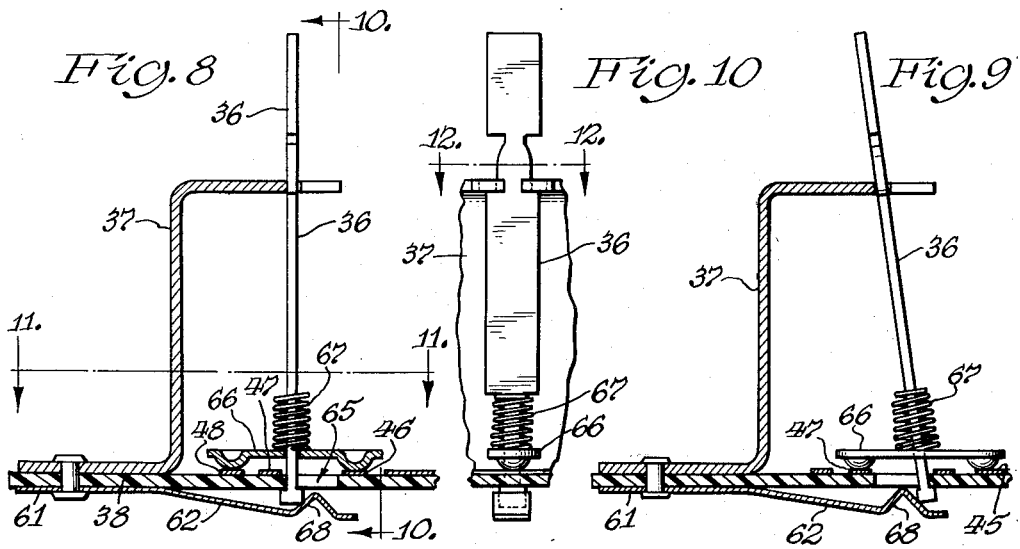
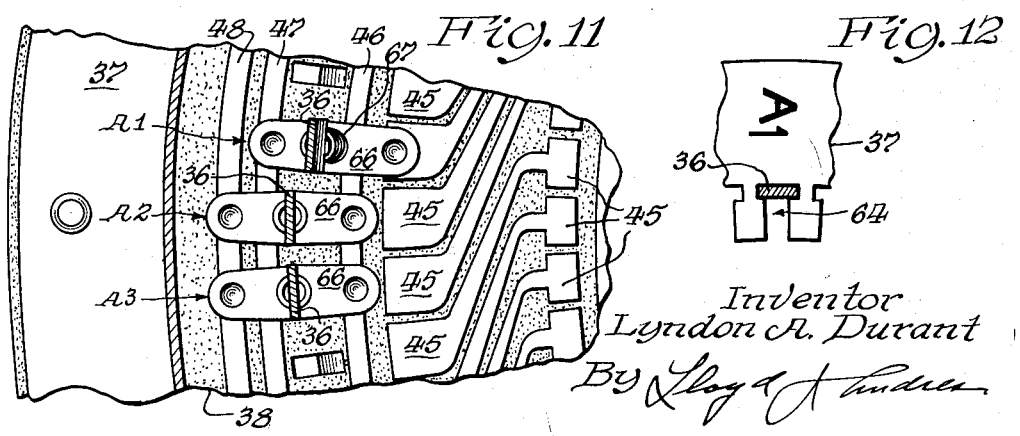
Inventor
Lyndon A. Durant
By Lloyd A. Linder

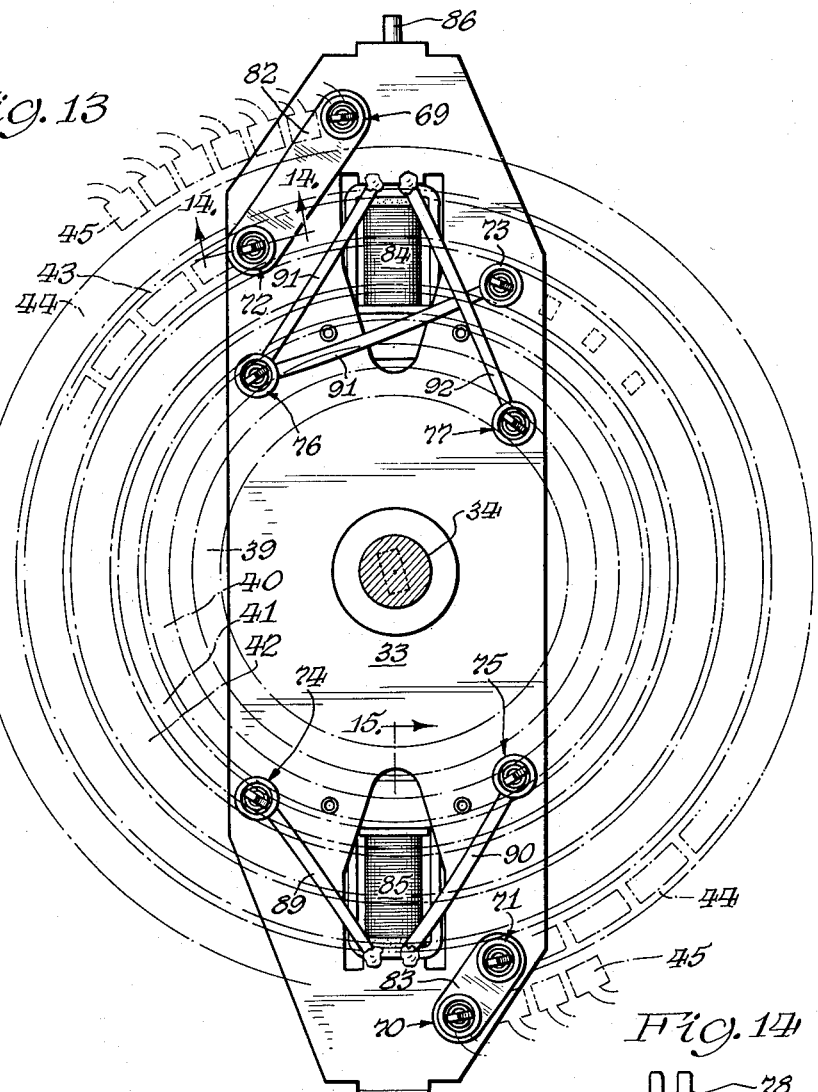

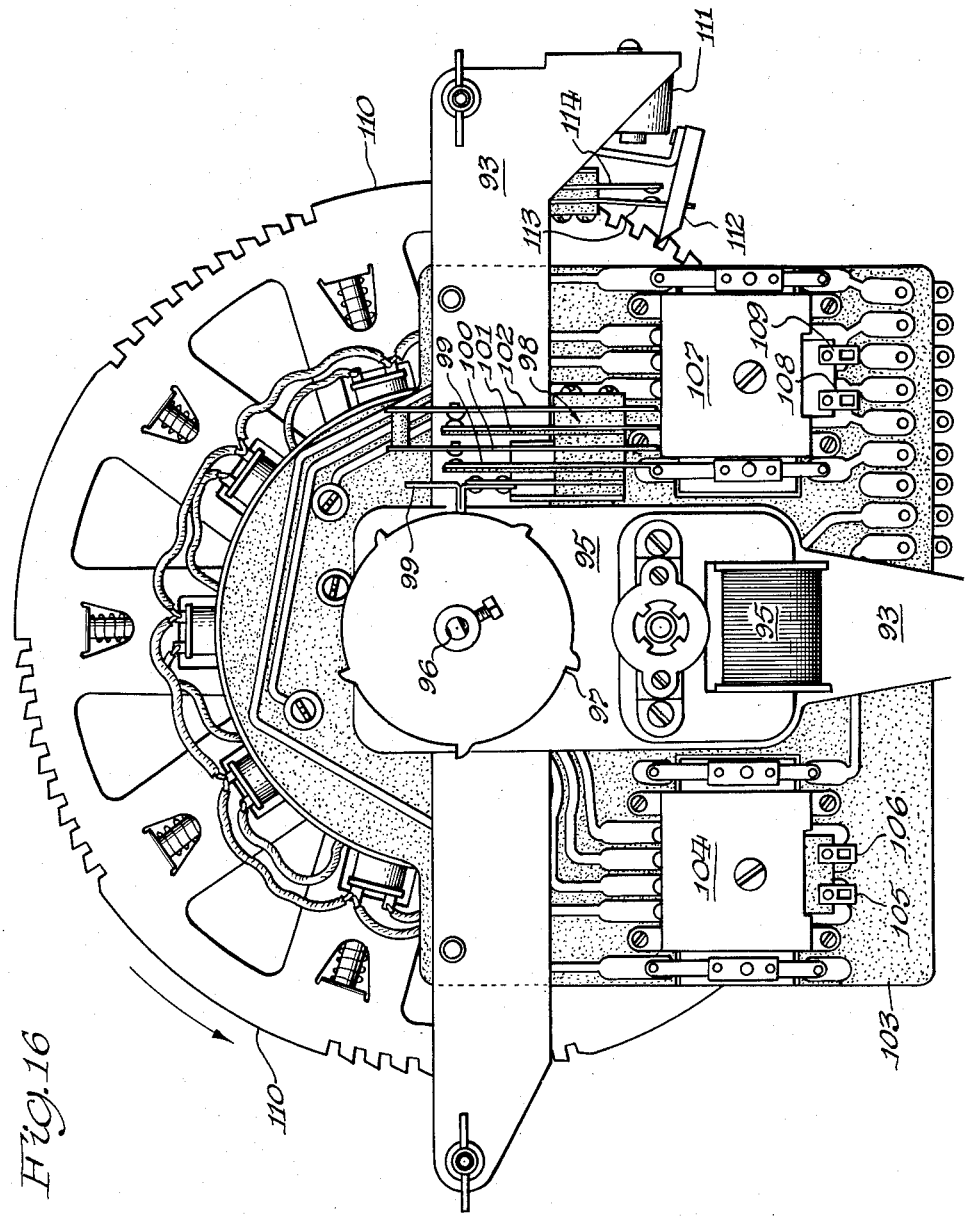

April 3, 1962 L. A. DURANT 3,028,580
RECORD PLAYER AND SELECTING SYSTEM THEREFOR
Filed April 7, 1958 15 Sheets-Sheet 10

Inventor
Lyndon A. Durant
By Lloyd Johnson

April 3, 1962 L. A. DURANT 3,028,580
RECORD PLAYER AND SELECTING SYSTEM THEREFOR
Filed April 7, 1958 15 Sheets-Sheet 11

Inventor
Lyndon A. Durant

By Lloyd Sanders

April 3, 1962   L. A. DURANT   3,028,580
RECORD PLAYER AND SELECTING SYSTEM THEREFOR
Filed April 7, 1958   15 Sheets-Sheet 12
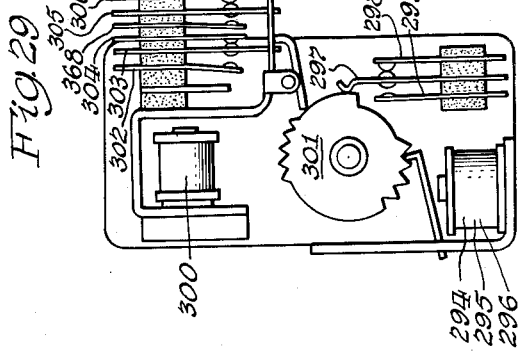
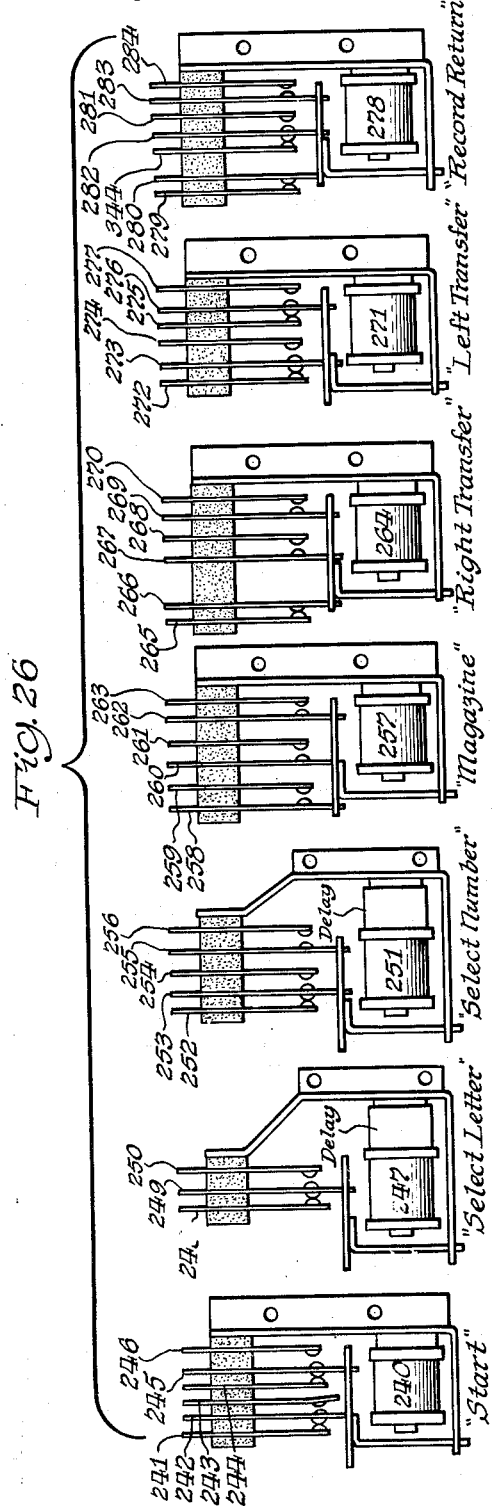
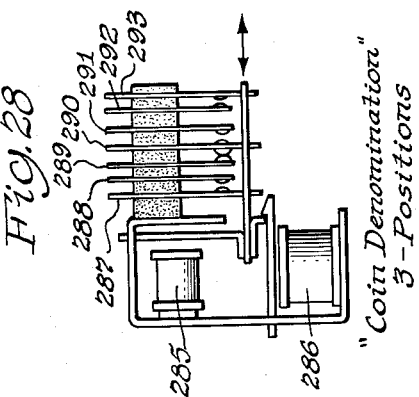
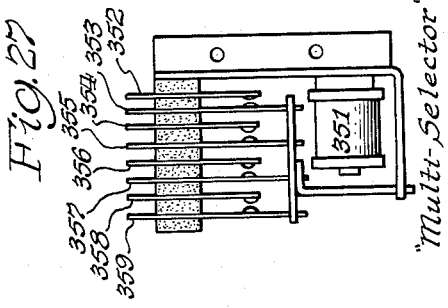
Inventor
Lyndon A. Durant
By

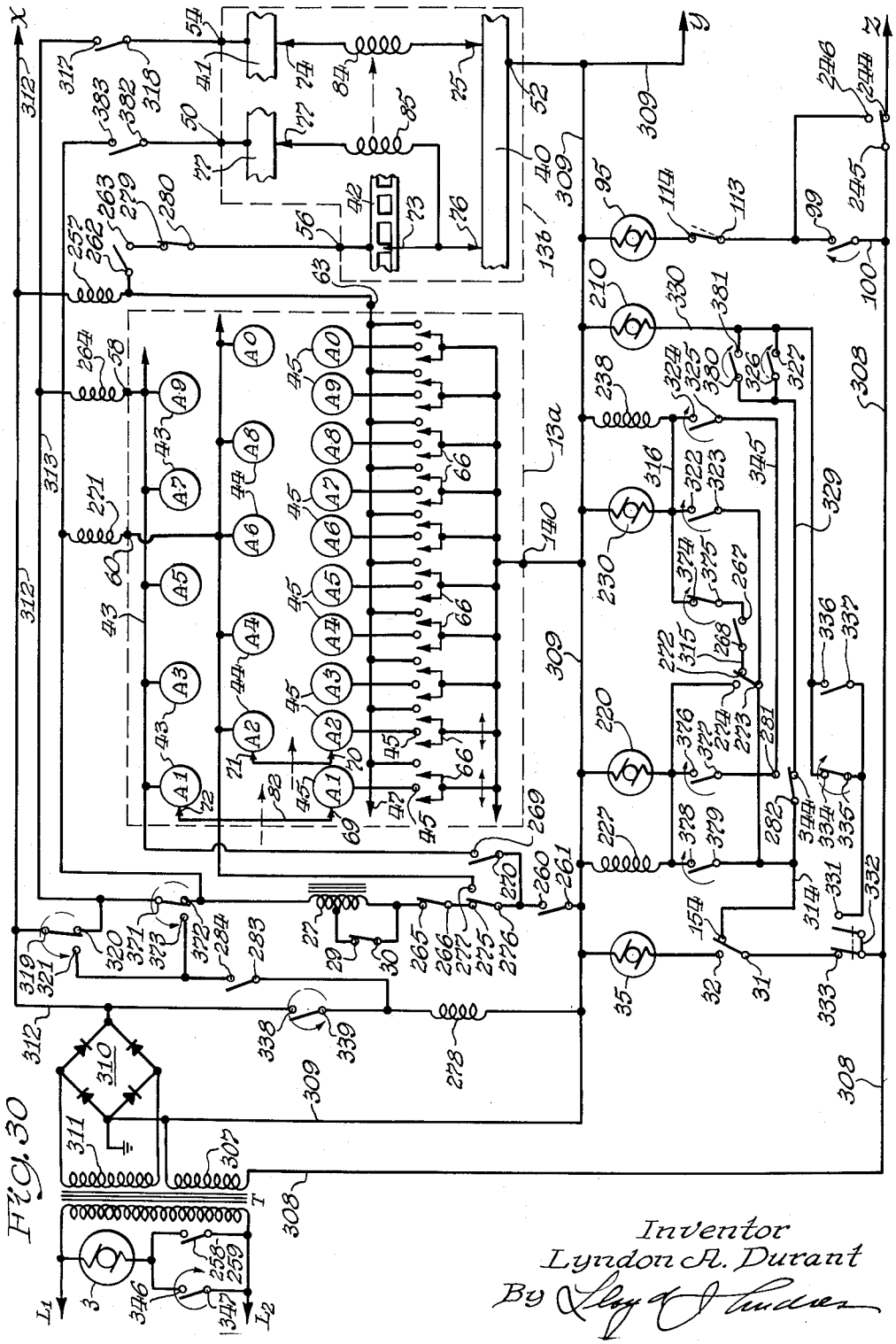

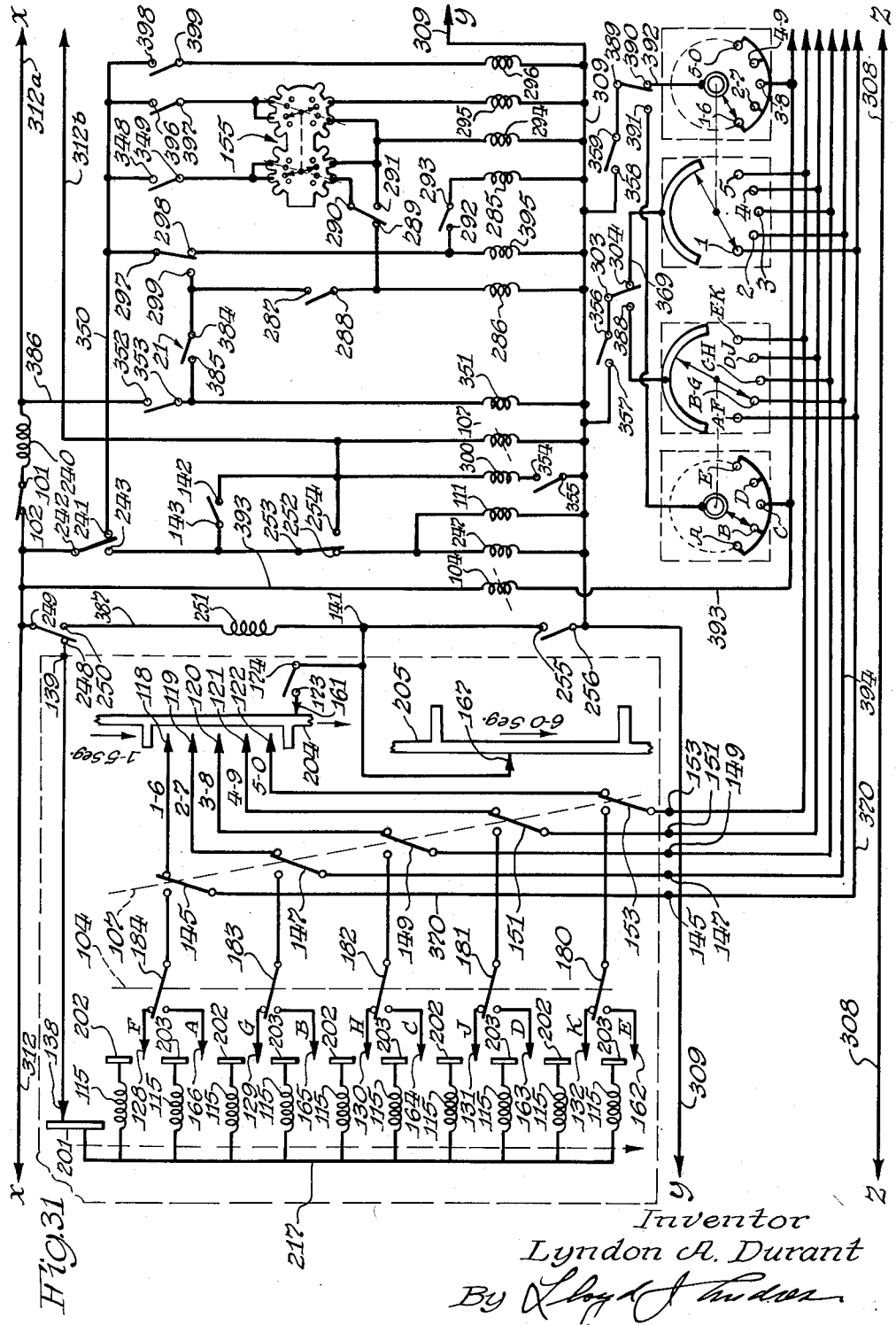

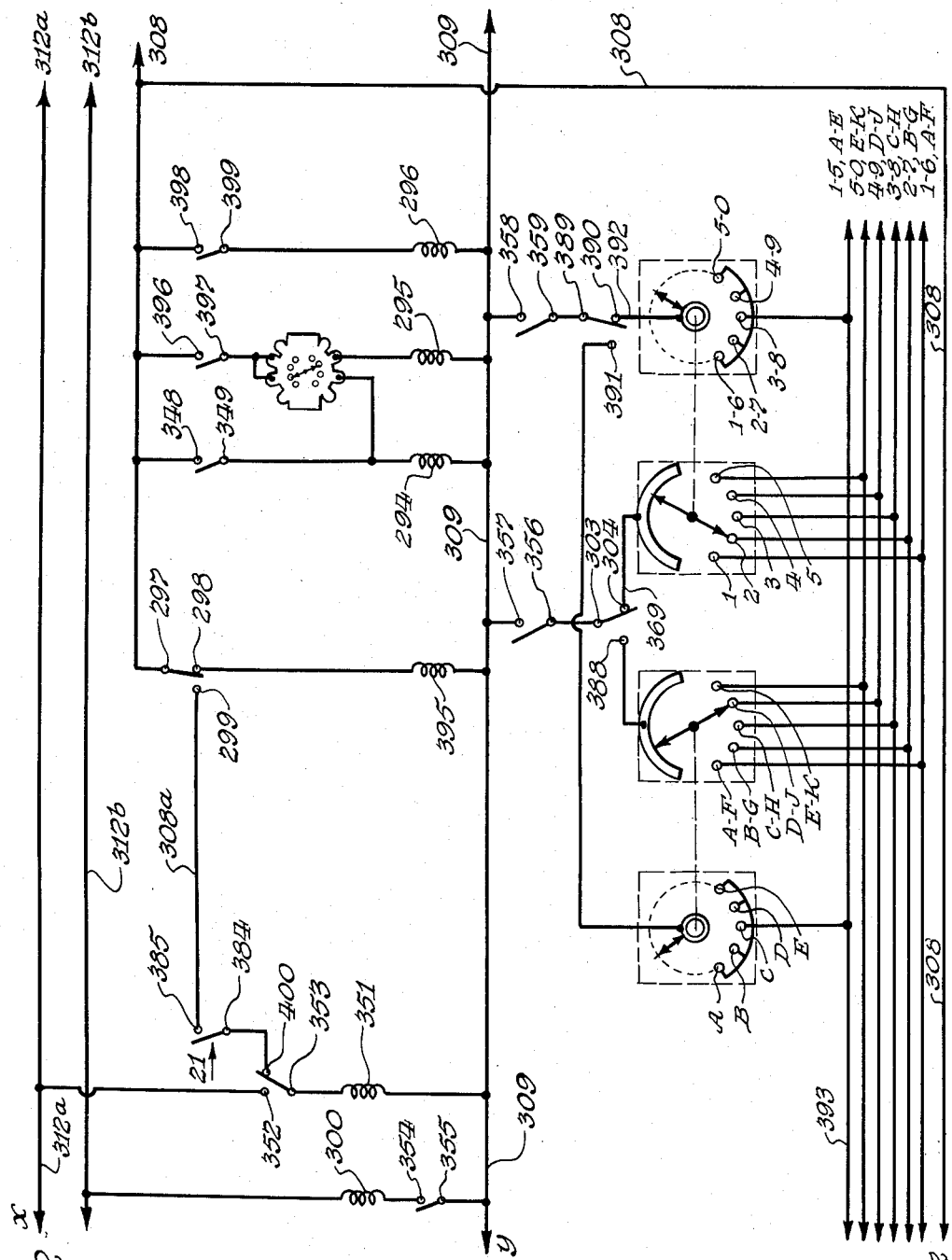

United States Patent Office 3,028,580
Patented Apr. 3, 1962

3,028,580
RECORD PLAYER AND SELECTING SYSTEM
THEREFOR
Lyndon A. Durant, Chicago, Ill., assignor to United Music Corporation, Chicago, Ill., a corporation of Illinois
Filed Apr. 7, 1958, Ser. No. 726,798
15 Claims. (Cl. 340—162)

This invention relates in general to selective phonographs and more particularly to an electrically operated and controlled record player including a selecting system for selectively playing both sides of disc records capable of operating in conjunction with the record player or at a remote distance therefrom.

Selective record players prior to this invention utilize record changing mechanisms in which the principal components thereof depend upon the coordinated operation of complicated precise mechanical means which are expensive to produce and difficult to assemble and service.

Selecting systems prior to this invention were usually dependent upon a plurality of electro-magnets in the record player corresponding in number to the selections available. These electro-magnets are selectively energized by either well-known annunciator circuits or pulsing-type transmitting and receiving devices both of which are relatively expensive to manufacture, assemble and install, and service.

When either of these systems are employed, further disadvantages arise because of the requirements of a relatively large number of panels of push buttons or multi-coded drums are required for manipulations which are complicated and time consuming in operation.

The present record player utilizes a simplified group of unit assemblies for mobile record storage, record transferring and record playing with each of said unit assemblies driven by small high production type electric motors and precisely time controlled by switches, relays and electric circuitry. These electric components in the main are standard parts from high production sources thus reducing manufacturing costs and greatly facilitating interchangeability for service adjustment and replacement.

Selections may be made by the selective positioning of two simple indicating dials and the operation of a single push button.

Reference is made to applicant's U.S. Patents No. 2,922,975, No. 2,866,865, No. 2,909,373 and No. 2,935,325. The above described phonograph unit assemblies are typical of those used in the record player in combination with the control and selecting system to be hereinafter described.

Through the use of the following novel circuitry, the above-mentioned electric components are adapted to control the multi-selective operation of the record player assemblies resulting in several important improvements and advantages in construction, mode of operation and in the results obtained as compared to prior type phonographs.

A principal object of the invention is the provision of an electric means in the record player by which each side of a large plurality of records stored therein will be automatically and selectively presented to a turntable for playing a relatively short period of time following the selective operation by a multi-selector control electrically related thereto.

A further object of the invention is the provision of a mobile record magazine, a record transfer means and a turntable playing means which are selectively and sequentially operated and coordinated by individual electric motors and controlled by an electric memory and selecting means responsive to a multi-selector control device.

Another object of the invention is the provision of a selective memory device for temporarily retaining a selected plurality of selections to be played in a record player. Said device related to a mobile record magazine and operated and restored by mobile electro-magnets.

A further object of the invention is the provision of a motor driven selecting mechanism related to a memory device and a mobile record magazine and responsive to electric circuitry connected by relatively few conductors to a manually operated multi-selector control device.

Another object of the invention is the provision of a motor driven selecting means for automatically completing the operation of selecting either side of a plurality of records in a mobile magazine in a relatively short period of time regardless of the rest position of said magazine when said selecting means is initiated.

Another object of the invention is the provision of electric relay means in said selective means for automatically distinguishing and selecting opposite side of each record in said magazine.

Another object of the invention is the provision of a coin controlled accumulator means associated with said selecting circuit for the selective playing of a predetermined number of selections in a record player corresponding with the predetermined value of coins of different denominations.

These and other objects and advantages in one embodiment of the invention are described and shown in the following specification and drawings in which:

FIG. 1 is a block diagram of the unit phonograph assemblies, control components and the general arrangement of the inter-connecting electric circuits.

FIG. 3 is a left-hand fragmentary perspective view of the magazine shown FIG. 2 with magazine drive and indexing mechanism attached thereto and the selector mechanism removed, showing the memory device shown FIG. 2.

FIG. 4 is an enlarged fragmentary side elevation of the indexing means for the magazine including electric switches operated thereby.

FIG. 5 is a top plan view of the memory device and selecting mechanism shown FIG. 2 in operating position with respect to the record magazine.

FIG. 7 is a fragmentary reverse elevation view of the memory device taken through section line 7—7, FIG. 5.

FIG. 8 is an elevation of trip lever taken through section line 8—8, FIG. 6.

FIG. 9 is the same as FIG. 8 in changed position.

FIG. 10 is an elevation of the trip lever viewed from section line 10—10, FIG. 8.

FIG. 11 is a fragmentary plan view of the memory device viewed from section line 11—11, FIG. 8.

FIG. 12 is a fragmentary plan view of one of the memory levers viewed from section line 12—12, FIG. 10, showing an indicia corresponding thereto.

FIG. 13 is an elevation of a memory rotor taken through section line 13—13, FIG. 5.

FIG. 14 is an elevation of one of the restore commutator brushes taken through section line 14—14, FIG. 13.

FIG. 15 is a cros-sectional elevation of a restore solenoid taken through section line 15—15, FIG. 13.

FIG. 16 is an elevation of the selecting mechanism illustrated, FIG. 1, and shown, FIG. 2.

FIG. 23 is a diagram illustrating the electric elements operated during the raising and lowering cycle of the turntable, shown FIG. 1.

FIG. 24 is a diagram illustrating the electric elements operated during the operation of the left transfer mechanism, shown FIG. 1.

FIG. 25 illustrates the electric elements operated during the operation of the right transfer mechanism shown FIG. 1.

FIG. 26 illustrates a group of control relays.

FIG. 27 illustrates a multi-selector relay.

FIG. 28 illustrates a dual coin relay.

FIG. 29 illustrates a coin accumulator.

Figure 2:
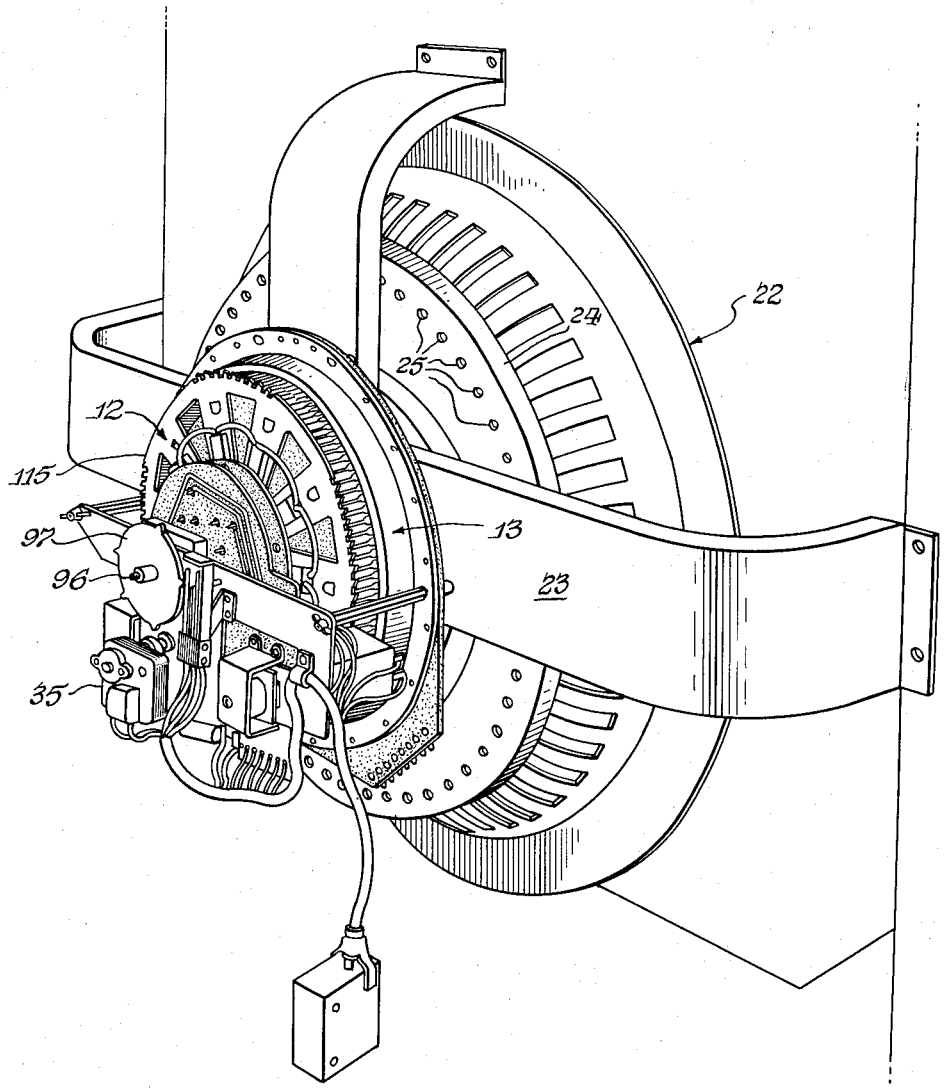
FIG. 2 is a right-hand fragmentary perspective view of a rotary record magazine with the memory device and selecting mechanism coaxially positioned thereto.

FIGS. 30, 31 and 32 collectively show the entire combination circuit inter-connecting the record player selecting and control components.

*General*

Referring to FIG. 1, the phonograph elements comprise a rotary magazine 1 for retaining a plurality of disc records and a combination magazine drive and indexing unit 2 adapted to rotate and selectively register oppositely disposed records in the magazine in a fixed transfer plane.

A motor driven turntable 3 for playing records transferred thereto is centrally positioned in front of the magazine.

A left record transfer mechanism 4 is adapted to transfer selected record from the left side of the magazine to the turntable and vice versa when sequentially operated, and a right record transfer mechanism 5 adapted to transfer a selected record from the right side of the magazine to the turntable and vice versa when sequentially operated.

A turntable raising and lowering mechanism 6 is adapted to raise the turntable 3 and raise a record thereon into playing contact with tone arm 7 and vice versa when operated.

A switch assembly 8 is responsive to the movement of tone arm 7 at the completion of the playing of a record for initiating the return transfer of the record.

An electronic amplifier 9 and speaker 10 are connected to the tone arm and a combination relay and circuit junction 11.

A memory device 13 is cooperatively related to magazine 1 and is electrically connected in junction 11.

A selecting mechanism 12 is cooperatively related to the memory device 13 and the magazine 1 and is electrically connected through junction 11 to a multi-selector 14.

The memory device 13 is responsive to the selecting mechanism 12 and is adapted to record and store pluralities of selected selections corresponding to individual sides of the records in the magazine.

A coin responsive mechanism 15 is adapted to receive coins of various denominations and electrically impulse an accumulator 16 for limiting the number of selections that can be made from the selector to correspond with the predetermined value of coins deposited.

A main power cable 17 connects the junction 11 to a source of alternating current electric power and a branch of cable 17 is connected to rectifier 18 for supplying direct current to the junction 11 for the operation of certain control elements to be hereinafter described.

Before proceeding with the detailed description of the construction of the phonograph, its circuitry and the selecting system therefor, a brief outline of the general operation is presented which incorporates the certain subject matter of applicant's previously listed pending applications.

Referring to FIG. 1, under the assumption that an operator desires two selections which are on opposite sides of a particular record, the operator deposits the appropriate coin or coins in the coin mechanism 15 which will be registered by accumulator 16 and for energizing the selector 14.

The dials on selector 14 are then rotated to the desired indices for the first selection and the selector button depressed. This will activate the selecting mechanism 12 to operate and register said selection in the memory device 13 and energize the magazine drive 2 to rotate the magazine 1 and position the selected record in the left hand transfer plane, whereupon the left-hand transfer mechanism will transfer the record with the first selected side uppermost to the turntable 3 which will sequentially rise by the action of the turntable mechanism 6 and raise the record into playing contact with the tone arm 7 and begin the play of the record.

Immediately following the selecting operation for the first selection, the second selection may be made in the same manner as the first selection which will operate the selecting mechanism to again operate and register in the memory device 13 the second selection. Simultaneously the coin accumulator unit will be restored and de-energize the selector 14.

At the completion of the play of the first selection, the tone arm will operate switch 8 to sequentially energize turntable mechanism 6 and the left transfer mechanism 4 to return the record to its original position in the magazine whereupon the magazine will rotate 180° and present the same record in the transfer plane at the right side of the magazine with its opposite side uppermost, and sequentially energize the right transfer mechanism 5 and the turntable mechanism to transfer and play the opposite side of the record in the same manner as previously described. Upon the return of the record to the magazine, the entire system will be de-energized.

It is to be noted that each time a record is transferred, the corresponding registration in the memory device is restored and cancelled.

*Magazine and Related Components*

FIG. 2 shows the right-hand perspective rear view of a rotatable magazine assembly 22 which is adapted to retain a large plurality of records in spaced radial position and is supported for rotation by main frame 23 as described in detail in applicant's application Serial No. 651,991, now Patent No. 2,866,865.

The selecting mechanism 12 and the stator portion of the memory device 13 are secured to main frame 23, as shown, in coaxial position with respect to the magazine and connected to the junction 11, FIG. 1, by conventional multi-conductor plugs.

FIG. 3 is a left-hand perspective view of the magazine 22 showing the drive and indexing unit 2 therefor which is adapted to rotate the magazine, in the direction shown by arrow, by means of frictional contact with rim 24 and is also adapted to index and register said magazine by means of apertures 25 corresponding in number and position to the records retained in the magazine.

FIG. 4 illustrates an indexing plunger 26 which is adapted to selectively engage each of the apertures 25 when solenoid 27 (FIG. 3) is operated. An arm 28 responsive to solenoid 27 reciprocates plunger 26 and is adapted to simultaneously operate switch blades 29, 30, 31, 32 and 154.

FIG. 3 also shows the stator portion of the memory device 13, with the selecting mechanism 12 removed, the circular formation of trip levers 36 which correspond in number to each side of the records in the magazine and also shows the memory restore rotor 33 which is secured to and adapted to be driven by the magazine shaft 34.

Thus when the motor 35 and solenoid 27 are energized, the magazine will rotate in the direction shown by arrow 5 and when the motor and solenoid are de-energized, the magazine will be stopped and registered by plunger 26 in a position to place a selected record therein in either the right or left fixed plane for transfer. Concurrently the memory rotor 33 will have moved to a position to register and restore the tripped selected lever 36 in the memory unit corresponding with the selected record.

Memory Device

Figure 6:
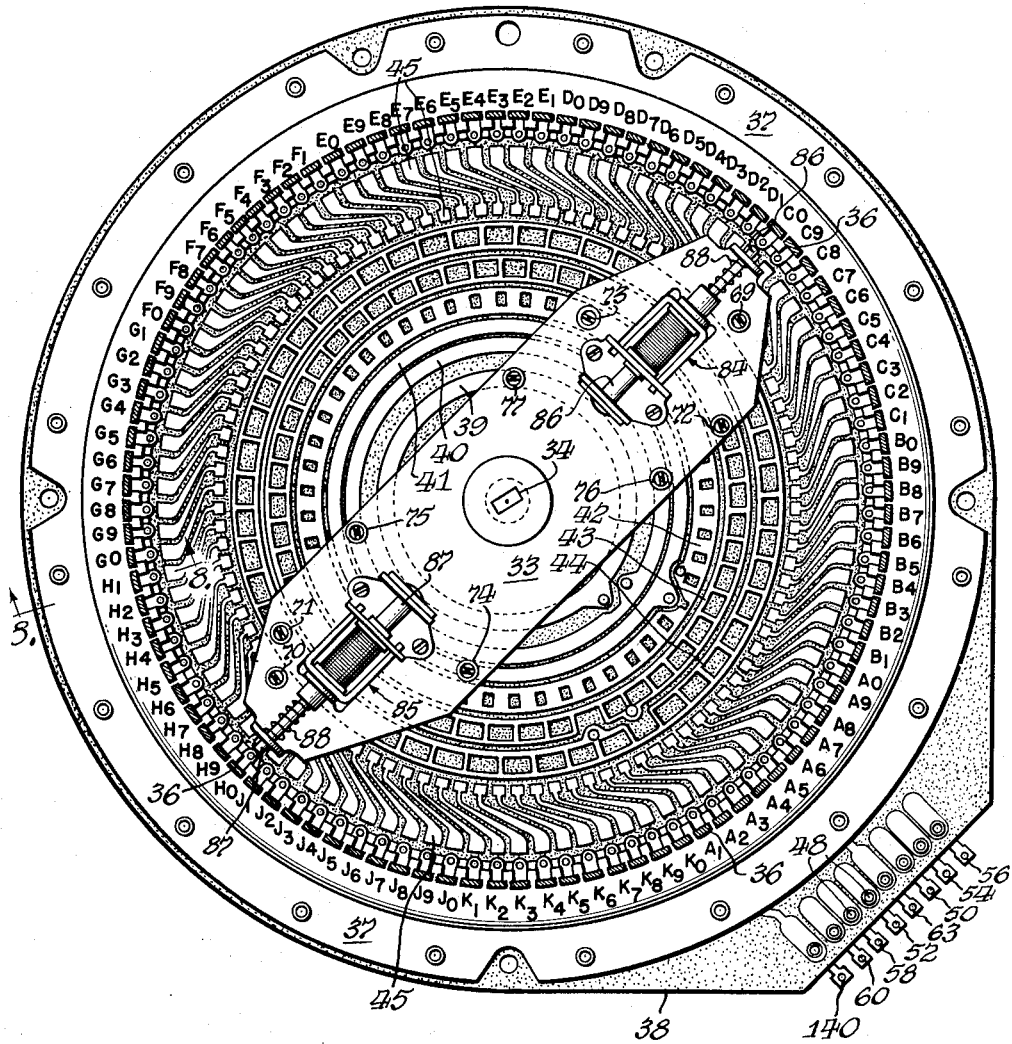
FIG. 6 is an elevation of the memory device taken through section line 6—6, FIG. 5 showing the indices relating to both sides of records stored in the magazine.

The memory device 13 is secured to the frame 23 as shown, FIGS. 5 and 6, which consists of a circular housing 37 and a main plate 38 made from dielectric material riveted to said housing.

On the face of plate 38, there are "printed" conducting circuits consisting of three inner concentric electrically independent slip-rings 39, 40 and 41 and four concentric segmental commutators 42, 43, 44 and 45. Concentrically surrounding the above commutators are three circular conductors better shown FIG. 11. Conductor 47, referring to FIG. 7, is connected to terminal 63. Conductors 46 and 48 provide a bearing for the dual pole members 66 and are electrically inactive.

Referring to the rear of plate 38, FIG. 7, slip-ring 39 is connected by conductor 49 to terminal 50. Slip-ring 40 is connected by conductor 51 to terminal 52. Slip-ring 41 is connected by conductor 53 to terminal 54. Ladder commutator 42 is connected by conductor 55 to terminal 56. Ladder commutator 43 is connected by conductor 57 to terminal 58. Ladder commutator 44 is connected by conductor 59 to terminal 60.

Concentrically riveted to the rear of plate 38 are ten detent plates 61 with each plate having ten spring detent fingers 62 radially projecting therefrom as shown. Each plate is electrically common to the housing 37 and connected to terminal 140.

Referring to FIGS. 8 through 12, each trip lever 36 is pivotally retained in a T slot 64 in housing 37 and projects through a corresponding slot 65 in plate 38.

A dual contact pole member 66 is urged downward as shown in FIG. 8 by spring 67 into normal straddling contact with rings 46 and 48 and is held in this position by a detent formation 68 in finger 62 in contact with the lower end of lever 36 which illustrates the normally restored position of each trip lever.

FIG. 10 illustrates a shoulder constriction means in the trip lever 36 which provides the "up" rest for same, including a narrow portion thereon whereby the lever may be normally depressed and released from housing 37 for assembly, removal and/or replacement of the pole member 66.

FIG. 9 illustrates the tripped position of each lever 36 when the outer end thereof is moved by the selecting mechanism. The inner end of lever 36 will override the detent 68 and place the pole member in contact with circular conductor 47 and a corresponding outer contact 45 of commutator 45, corresponding to a selected selection.

It is to be noted that each segment of commutator 45 is adapted to be selectively contacted by each pole member 66 and contacted by brush members 69 and 70 at its inner end thereof, as illustrated in FIGS. 5, 6 and 11.

FIG. 11 shows three of the trip levers in their operating positions with the lower two in restored position and the upper one in tripped, or memory, position for initiating the play of a selected side of a selected record.

Referring to FIGS. 6 and 13, the memory rotor 33 carries brush assemblies 69 and 70 which are positioned on rotor 33 to sequentially contact opposite contacts 45.

Brush assembly 71 is positioned to sequentially contact ladder commutator 44 and is connected to brush 70 by conductor 83. Brush assembly 72 is positioned to sequentially contact ladder commutator 43 and is connected to brush 69 by conductor 82. Brush assembly 73 is positioned to sequentially contact ladder commutator 42. Brush assembly 74 is positioned to continuously contact slip-ring 41. Brush assemblies 75 and 76 are positioned to continuously contact slip-ring 40. Brush assembly 77 is positioned to contact slip-ring 39.

Each brush assembly is illustrated in FIG. 14 showing the contactor 78 slidably retained in a flanged bushing 79 insulated from the rotor 33 by a dielectric bushing 80 and urged into contact with its mating commutator or slip-ring by spring 81.

Referring to FIGS. 6, 13 and 15, a pair of electric solenoids 84 and 85 are secured to opposite outer portions of rotor 33 with the outer end of the plungers thereof 86 and 87 normally retracted by springs 88—88 and having the outer ends of the plungers positioned to engage and restore each trip lever 36 when registered therewith when the solenoid is energized, as illustrated by dotted lines in FIG. 15.

Referring to FIG. 13 showing the underside of rotor 33, the two terminals of solenoid 85 are connected to brushes 74 and 75 by conductors 89 and 90. One terminal of solenoid 84 is connected to brushes 76 and 73 by conductors 91—91. The remaining terminal of solenoid 84 is connected to brush 77 by conductor 92.

Thus it is apparent that solenoids 84 and 85 may be precisely energized in each segmental position of rotor 33 through their associated brushes, slip-rings and commutators when the latter are connected in circuits to be hereinafter described.

Referring to FIG. 6, it is to be noted that there are 100 trip levers 36 equi-spaced around the inner periphery of the housing 37. Each trip lever corresponds with one side of each record in the magazine. The magazine in this embodiment is adapted to retain 50 records.

The selecting mechanism to be hereinafter described is arranged to sequentially operate any selected number of trip levers which will be retained in tripped position until restored by either one of the solenoids 84 or 85 when the record corresponding therewith is transferred, dependent upon the particular sides of the records selected.

It is also to be noted that each trip lever is identified by a letter and numeral on the housing 37 which corresponds to indices on the selector dials 19 and 20 shown FIG. 1. Dial 19 is divided into segments lettered A, B, C, D, E, F, G, H, J, and K. Dial 20 is divided into segments numbered 1, 2, 3, 4, 5, 6, 7, 8, 9 and 0. Thus each dial may be rotated to an index point with a letter and a numeral respectively corresponding with one of the trip levers 36 in the memory device 13. The indices, shown FIG. 6, are arranged in ten groups 1 through 10 numerals in combination with ten groups of letters A through K. The letter "I" omitted because of confusion with the figure "1."

Selecting Mechanism

Referring to FIGS. 5 and 16, all of the elements of the selecting mechanism are mounted on a sub-frame 93 which is secured to main frame 23 by spacers 94 and wing nuts as shown. A third lower spacer and wing nut are not shown.

An electric gear motor 95 secured to frame 93 has its drive shaft 96 positioned coaxial with magazine shaft 34.

A five-tooth pawl wheel 97 is secured to the outer end of drive shaft 96 as shown. A combination control pawl-switch assembly 98 is secured to frame 93 with its operating arm thereof positioned in the path of movement of the abutments on wheel 97.

The switch assembly 98 comprises blades 99, 100, 101 and 102 responsive to movement of arm 99 and shown in rest position.

A dielectric panel 103 is secured to frame 93 as shown and carries thereon a multi-contact "letter" relay 104 having coil terminals 105 and 106, and multi-contact "change-over" relay 107 having terminals 108 and 109.

Figure 17:
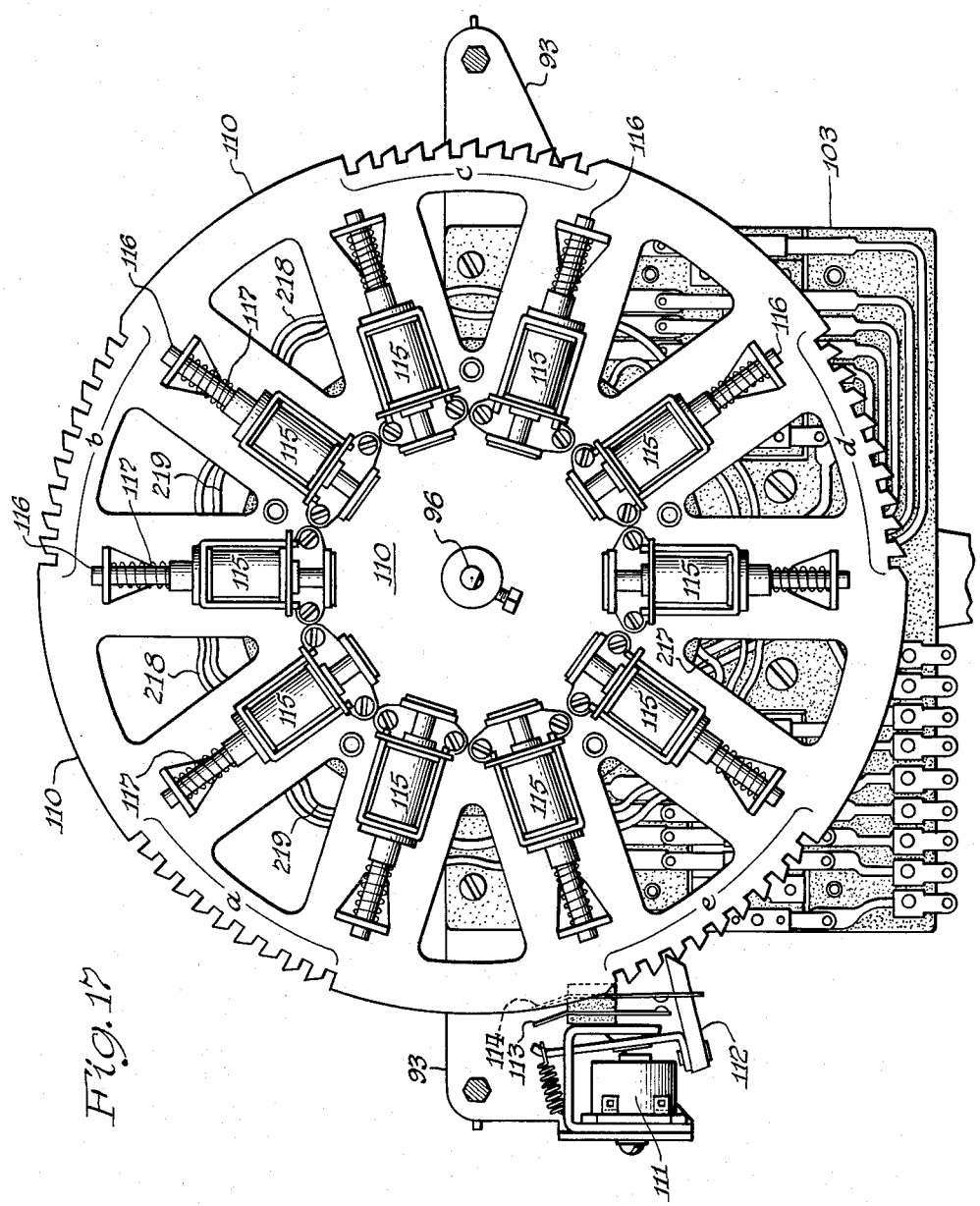
FIG. 17 is an elevation of the selecting mechanism taken through section line 17—17, FIG. 5.

Referring to FIG. 17, an indexing wheel or rotor 110 is secured to the inner end of drive shaft 96 and adapted to be driven thereby. Five equi-spaced groups of stop abutments on the periphery of the wheel are identified by *a*, *b*, *c*, *d*, and *e*, as shown.

An indexing relay assembly 111 is secured to frame 93 and has an armature pawl 112 normally tensioned to engage each stop abutment as shown. A pair of normally open contact blades 113 and 114 are adapted to close when said relay is energized and when pawl 112 is resting on the smooth outer edge of wheel 110.

Ten selecting solenoids 115 are secured in equi-spaced radial position on indexing wheel 110 as shown. Each solenoid plunger 116 is urged in its normal inward position by spring 117 and each plunger 116 is positioned and adapted to register with the outer end of each trip lever 36 in the memory device when said wheel is rotated to register therewith and said solenoid will operate said select lever when momentarily energized, as illustrated FIG. 15.

Figure 18:
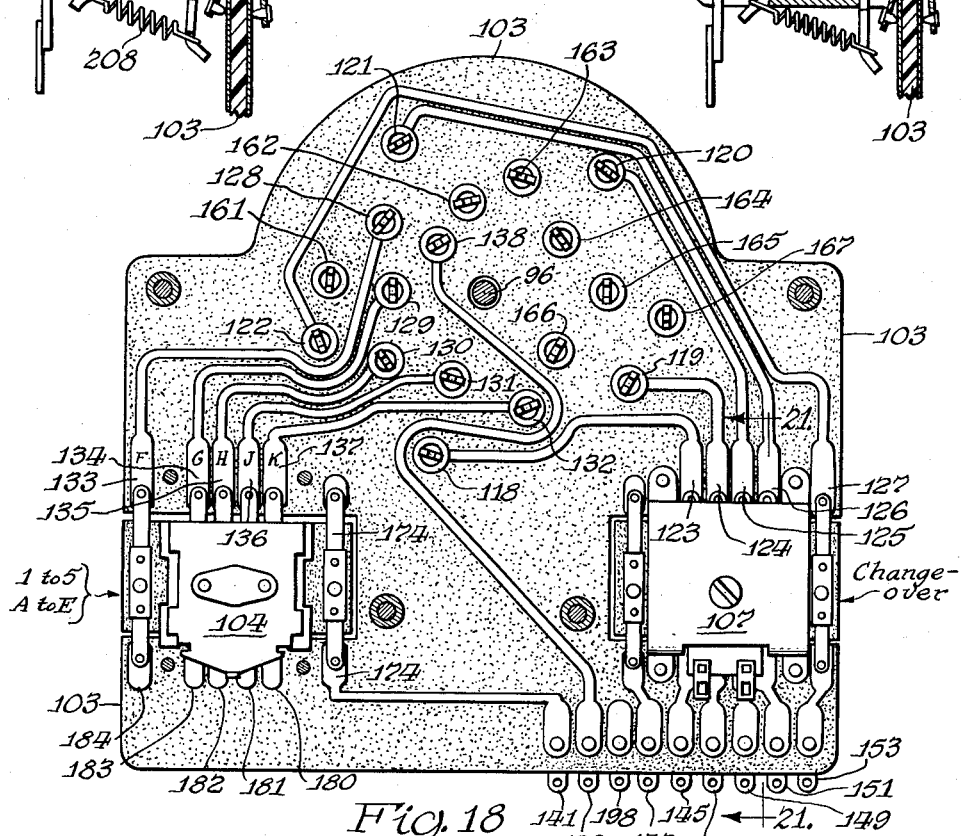
FIG. 18 is an elevation of the selecting brush assembly including two selecting relays and "printed circuits" therefor taken through section line 18—18, FIG. 5.

Referring to FIG. 18, relay 104 (1 to 5, A-E) and relay 107 (change-over) are secured in apertures in panel 103 together with brushes 118, 119, 120, 121 and 122 which are connected to conductors terminating as contacts 123, 124, 125, 126 and 127 of relay 107 respectively.

Brush assemblies 128, 129, 130, 131 and 132 are connected by conductors terminating as contacts 133, 134, 135, 136 and 137 of relay 104.

Brush 138 is connected to terminal 139.

Contact 174, common with blade 174 of relay 104, is connected to terminal 141.

Figure 19:
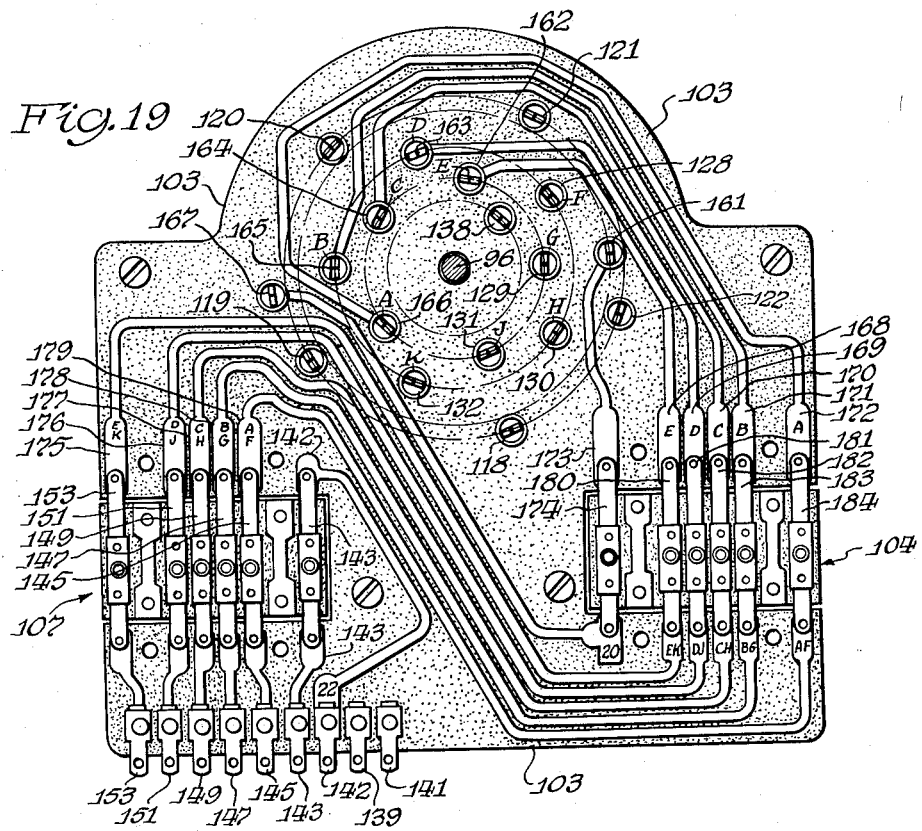
FIG. 19 is an elevation showing the opposite side of FIG. 18 including a different "printed circuit" taken through section line 19—19, FIG. 5.

Referring to FIG. 19, contact 142 of relay 107 is connected to terminal 142. Blades 143, 145, 147, 149, 151 and 153 are common to terminals 143, 145, 147, 149, 151 and 153 respectively. Said blades are normally in open position with respect to contacts 142, 179, 178, 177, 176 and 175, as shown.

Contacts 175 to 179 inclusive are connected to blades 180, 181, 182, 183 and 184 of relay 104 respectively, as shown. Blade 174 of relay 104 is connected to brush 167 and normally open with respect to contact 173. Contact 173 is connected to brush 161.

Blades 180 to 184 inclusive are normally open with respect to contacts 168, 169, 170, 171 and 172 respectively. Brushes 162, 163, 164, 165 and 166 are connected to contacts 168, 169, 170, 171 and 172 respectively.

The brush assemblies in the selecting mechanism are essentially of the same construction as illustrated in FIG. 14 except for the absence of bushing 80.

All of the conductors and relay contacts on panel 103 are applied by "printed circuit" technique.

Figure 20:
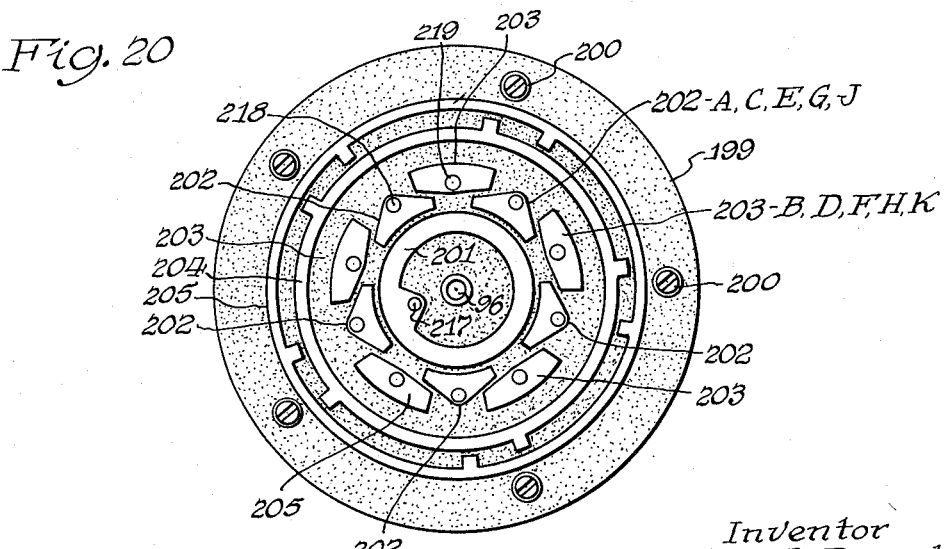
FIG. 20 is an elevation of the selecting mechanism commutator taken through section line 20—20, FIG. 5.

Referring to FIG. 20, a dielectric commutator disc 199 is coaxially secured for rotation on wheel 110 by screws 200, and has "printed" thereon slip-ring 201, five concentrically positioned commutator segments 202, five concentrically positioned commutator segments 203, and a pair of combination slip-ring commutators 204 and 205, as shown.

Brushes in panel 103 are adapted to register with disc 199 as follows: Brush 138 is positioned to contact slipring 201; brushes 129, 131, 162, 164 and 166 are positioned to intermittently contact commutator segments 202; brushes 128, 130, 132, 163, 165 are positioned to intermittently contact commutator segments 203; and brushes 118, 119, 120, 121 and 122 are adapted to sequentially and alternately contact commutators 204 and 205. Brush 161 is common to commutator 204 and brush 167 is common to commutator 205.

It is to be noted that the contact segments on commutators 204 and 205 are alternately spaced with respect to the axis of rotation and the angle between said segments coincides with the angle spanned by five trip levers 36 in the memory device. It is also to be noted that each of the alternate positioned segments 202 and 203 cover an angle to coincide with the span of five trip levers 36.

The arrangement of the above segments and brushes provide circuits for selectively energizing each of solenoid magnets 115 to trip preselected trip levers in the memory device in a minimum of elapsed time which will be hereinafter described in the circuits in which they operate.

Figure 21:
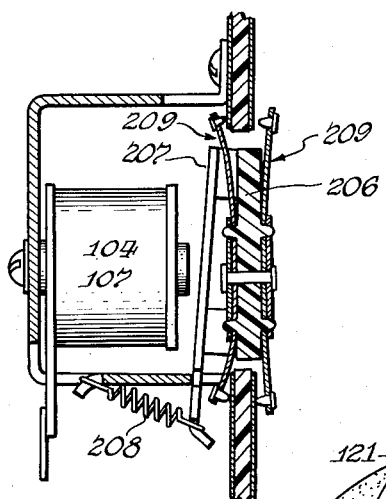
FIG. 21 is a cross-sectional view of both of the multi-contact relays 104, 107 taken through section line 21—21, FIG. 18.

Referring to FIG. 21, relays 104 and 107 are the same and consist of a coil and a frame secured to panel 103. An insulator 206 is secured to armature 207 normally urged into position shown by spring 208.

Figure 22:
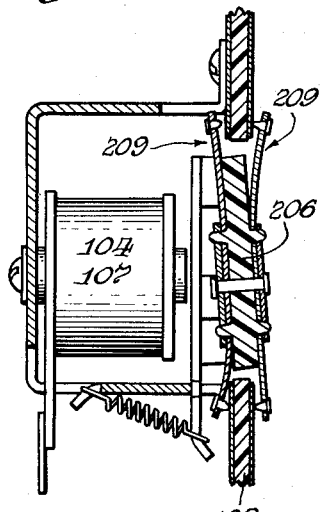
FIG. 22 is the same as FIG. 21 in changed position.

Six poles 209 are secured in spaced relation on each opposite side of insulator 206 as shown in FIGS. 18, 19 and 21. The lower contacts in poles 209 are in permanent contact with the "printed circuit" contacts on panel 103 and the upper contacts of each pair of poles are arranged to operate as S.P.D.T. switch when the relay is operated. FIG. 22 illustrates the position of the poles 209 when either of the relays 104 or 107 are energized.

One of the important features of the selecting mechanism resides in its ability to trip a selected trip lever in the memory unit in a minimum of elapsed time. This is particularly important in selective phonographs having a relatively large number of selections. In this embodiment the elapsed time to complete the selecting operation is between 0.05 second and 1 second. This feature is accomplished by the use of ten selector solenoids 115, shown FIG. 17. Regardless of the position of the wheel 110 following the completion of play of a given selected record a relatively small angular rotation of wheel 110 will scan and trip a selected trip lever in the memory device corresponding to the selected side of any record in the magazine since each successive electro-magnet 115 is adapted to be energized to trip a given lever 36.

Slip-ring 201, shown FIG. 20, is connected by a common conductor 217 to one terminal of each of the ten solenoids 115, shown in FIG. 17. Each commutator segment 202 is connected by a conductor 218 to five remaining terminals on alternate positioned solenoids 115. Each commutator segment 203 is connected by conductor 219 to the remaining terminals of the five remaining solenoids 115.

The slip-ring portion of 204, shown FIG. 20, is adapted to traverse brush 161 and the slip-ring portion of 205 is adapted to traverse brush 167. The commutator portions of 204 and 205 are adapted to be intermittently traversed by brushes 118, 119, 120, 121 and 122.

The detailed operation of the selecting mechanism will be hereinafter described in the circuit description.

*Turntable and Record Transfer Mechanism*

Referring to FIG. 1, the turntable 3 is rotated by conventional motor means, not shown, and is adapted to raise a record transferred thereon into playing contact with tone arm 7 and upon the completion of play to lower the record for return transfer. When the tone arm 7 has completed the play of a record, its movement will operate switch means 8 to initiate the restoring cycle of the machine.

Referring to FIG. 23, a transmission, not shown, is adapted to be driven by motor 210 for positively rotating shaft 211 and crank 212, 180° for raising the turntable from its lowermost position to its upper playing position and simultaneously switching control circuits. A further 180° rotation of crank 212 is adapted to lower the turntable to its initial position. Secured to shaft 211 is a cam 213 which is adapted to sequentially operate switch assemblies 214, 215 and 216, as illustrated, during the rotation thereof.

Referring to FIG. 24 and in view of applicant's Record Transfer Mechanism, application Serial No. 666,520, now Patent No. 2,909,373, a motor 220 having a positive driven transmission, not shown, is adapted to transfer registered selected records from the left side of the magazine to and from the turntable for each complete revolution of the transfer drive shaft 221.

Three cams 222, 223, and 224 are secured in spaced relation on shaft 221, as illustrated. Switch assemblies 225 and 226 are positioned at opposite sides of cam 224 and adapted to be operated thereby. An electro-magnet 227 has an armature stop member 228 normally adapted to engage cam 223 when de-energized and switch assembly 229 is positioned to engage cam 222.

Referring to FIG. 1, the record transfer mechanism 4 is adapted to transfer records from the left side of the magazine to the turntable for playing one side thereof when motor 220 is energized and concurrently operates control switch assemblies 225, 226 and 229. When the transfer elements are in either the home position or the turntable position, the armature 228 will serve as a positive stop to prevent over-travel of the transfer elements following de-energizing of motor 220.

FIG. 25 shows the right transfer mechanism for playing the opposite sides of records from the right side of the magazine, motor 230, drive shaft 231 and cams 232, 233 and 234, are the same as the left elements described in FIG. 24 except of opposite hand. Switch assemblies 235, 236 and 237 are positioned with relation to the cams as shown, the action of which will be hereinafter described.

Electro-magnet 238 and its armature 239 are adapted to prevent over-run of shaft 231 when the magnet and motor 230 are de-energized.

*Control Relays*

In addition to the two multi-contact relays 104 and 107, shown FIG. 16, a group of control relays required are illustrated in FIGS. 26, 27, 28 and 29, with their respective switch blades shown in normal inoperative positions.

A "start" relay 240 has contact blades 241—242—243, 244—245—246.

A "select letter" relay 247 has contact blades 248—249—250.

A "select number" relay 251 has contact blades 252—253—254, 255—256.

A "magazine" relay 257 has contact blades 258—259, 260—261, 262—263.

A "right transfer" relay 264 has contact blades 265—266, 267—268, 269—270.

A "left transfer" relay 271 has contact blades 272—273—274, 275—276—277.

A "record return" relay 278 has contact blades 279—280, 281—282—283, 284—344.

FIG. 27 is the "multi-selector" relay 351 positioned in the multi-selector 14, shown FIG. 1, and is provided with switch blades 352—353, 354—355, 356—357, 358—359.

The relay, shown FIG. 28, is a conventional latching relay having coils 285, 286 and related blades 287—288, 289—290—291, 292—293.

The accumulator illustrated in FIG. 29, shown in detail in applicant's application Electric Credit Accumulator, Serial No. 640,208, has three credit coils 294, 295 and 296 and cam switch blades 297—298—299. A reset coil 300 is adapted to operate the credit cam 301 and function as a relay for operating switch blades 302—303—304, 305—306—368.

*Record Player and Selecting Circuits*

The circuit diagram shown FIGS. 30, 31 and 32 includes all of the components previously described and their circuit relation in their normal inoperative positions.

The record playing elements are adapted to selectively play opposite sides of each record by selectively positioning one side uppermost at the left side of the magazine and the opposite side uppermost at the right side of the magazine, for playing, depending upon which side is selected by the multi-selector dials.

Referring to FIG. 6, it is to be noted that each segment 45 corresponds to a side of the record in the magazine. One of the purposes of the memory device is to selectively distinguish between opposite sides of each record so they may be positioned in separate transfer positions in opposite sides of the magazine when selectively indexed. The letters A, B, C, D, E, F, G, H, J and K when combined with numerals 1, 2, 3, 4, 5, 6, 7, 8, 9 and 0 represent one hundred selections corresponding with both sides of fifty records.

In this embodiment each letter combined with an odd number 1, 3, 5, etc., correspond with one side of each record for registration in the right side of the magazine whereas each letter combined with even numbers 2, 4, 6, etc., correspond with the opposite sides of the records for registration in the left side of the magazine.

Referring to FIG. 30, the entire circuit is powered from a transformer T having its primary connected to a source of alternating current power $L_1$ and $L_2$. One secondary 307 of transformer T is connected to relatively low voltage main conductors 308 and 309.

A rectifier 310 connected to transformer secondary 311 supplies direct current to the common conductor 309 and the D.C. main conductor, 312, as shown. The main feeders 308 and 309 and 312 run through FIGS. 30, 31 and 32, broken between the three sheets of drawings at X, Y and Z, as shown, for supplying both A.C. and D.C. power to the circuit components. The purpose of the direct current relates to the use of inexpensive time delay relays and the high energy solenoid 27 to be hereinafter described.

The dotted outlines 13a and 13b, FIG. 30, show the circuit in the memory device previously described for temporarily storing pluralities of selections.

When any one or more of the circular formation of trip levers 36, shown FIGS. 3 and 6, are tripped by the operation of the selector assembly into the position shown FIG. 9, the sides of the records in the magazine corresponding with said tripped levers will be selectively and sequentially played.

Under the assumption that trip lever A–1, shown FIG. 6, is tripped, the elements and circuits operate as follows. When pole 66, numbered A–1, is tripped into contact with a corresponding outer segment 45 and into contact with circular conductor 47, a circuit from conductor 309 will be established through terminal 140, terminal 63 through the "magazine" relay 257 to conductor 312 thus energizing "magazine" relay. Note: all switches bearing a circular arrow are cam operated.

Contact blades 258—259 will close and energize and rotate the motor driven turntable 3 shown connected across primary of transformer T.

Simultaneously contacts 260—261 of relay 257 will close and complete a circuit from conductor 309 through the non-shorted portion of solenoid 27 to conductor 312 through the closed switch blades as shown.

When solenoid 27 is energized the indexing plunger 26, shown FIG. 4, will be withdrawn from its indexed position in the magazine 22 and the switch blades 29 and 30 will be opened which permit the full coil of solenoid 27 to be energized with a corresponding smaller holding force and simultaneously switch blade 31 will break contact with blade 154 and make contact with blade 32 which will complete a circuit from conductor 308 to conductor 309 through the magazine drive motor 35 which will begin the rotation of the magazine. The memory rotor 33 will now begin the scanning of segments 45 on plate 38, shown FIG. 6.

The closure of blades 262—263 of the "magazine" relay 257 will hold the relay energized through circuit shown until the completion of one cycle of play.

It is now apparent that any tripped lever 36 will complete a partial circuit to the inner end of each segment 45 from the main conductor 309.

Referring to FIG. 6, it is to be noted that the commutators 43 and 44 have their ladder segments spaced to correspond with alternate segments 45.

The brushes 69 and 72, shown FIG. 6, and illustrated in FIG. 30, are bridged by conductor 82, shown FIG. 13, whereby through the rotation of rotor 33 a circuit will be established from commutator segment 45, numbered A–1, through a corresponding segment of inner commutator 43 through right transfer relay 264 and a conductor 313 through closed switch 320—319 to the main conductor 312 thus energizing the right transfer relay 264, shown FIG. 26.

It is to be noted that brushes 70 and 71 are positioned to bridge alternate segments 45 with commutator 44 for the purpose of selectively energizing the left transfer relay 271 for playing the "even number" opposite sides of records corresponding thereto.

The blades 269—270 on "right transfer" relay 264 hold solenoid 27 temporarily energized for permitting the rotation of the magazine to continue until registered and indexed. When brush 69 registers with A–1 or any energized contact 45, the blades 266—265 on the "right transfer" relay 264 open to break the circuit through solenoid 27, thus permitting plunger 26, shown FIG. 4, under the influence of a spring, not shown, to move toward its indexed position and against the rear face of the magazine, and then into indexed position which de-energizes the magazine motor 35 by virtue of blade 31 breaking contact with blade 32 on the indexing mechanism, shown FIG. 4.

Referring to FIGS. 4, 6 and 30, the rotation of the memory rotor 33 will now be stopped with plunger 87 in register with trip lever numbered A–1, and brush 73 in contact with a bar on commutator 42, brushes 75 and 76 in contact with slip-ring 40 and brush 74 in contact with slip-ring 41, thereby establishing a partial circuit from conductor 309 through terminal 52, through restore solenoid 84, terminal 54, to switch blade 318 on right transfer mechanism, shown FIG. 25.

The movement of blade 31, into contact with blade 154, will complete a circuit through the now closed blades 267—268 on the "right transfer" relay 264, via conductors 314, 315 and 316 through the right transfer motor 230, and the electro-magnet brake 238, to main conductor 309, thus releasing the brake and energizing the motor 230 in the right transfer mechanism, shown FIG. 25, to begin the right transfer cycle for the purpose of transferring a record from the right side of the magazine with the selected side A–1 uppermost to the turntable 3 for playing.

Referring to FIG. 25, the first 180° rotation of shaft 231 will complete the forward record transfer, and the second 180° rotation will complete its return transfer including the following operations.

While drive shaft 231 rotates through a small angle, switch blades 317 and 318 will complete a circuit through the "odd number" restore solenoid 84, shown FIGS. 6, 13 and 30, from the main conductor 309 via blades 317—318, conductor 313 through closed switch blades 319—320 to main conductor 312, thus the plunger 86 will restore the tripped lever 36 marked A–1 to its original position.

When shaft 231 rotates approximately 45°, switch blade 319 will move from its contact with blade 320 into contact with blade 321 and thus opening the circuit to "right transfer" relay 264 thus opening blades 267—268 and maintaining an open circuit to indexing solenoid 27 until the right-hand transfer motor has returned the selected record to the magazine.

The now closed switch blades 322—323 hold a circuit to motor 230 until shaft 231 rotates 180° from its rest position at which time blades 322—323 open de-energizing the motor and releasing the brake lever 239 to precisely stop rotation of shaft 231 corresponding with the transfer of the record to its position coaxial with turntable 3.

When this 180° rotation of shaft 231 is completed, blades 324—325 close to make a partial circuit to blade 281 on "record return" relay 278. Blades 326—327 simultaneously close to complete a circuit from main conductor 308 via conductors 329 and 330 to energize the turntable lift motor 210 and to initiate the rise of the turntable for placing the record in playing contact with the tone arm 7.

During the ensuing 180° rotation of shaft 211 in raising the turntable 3, cam 213 will successively operate switch assemblies 214, 215 and 216 as follows.

The first small movement of cam 213 will close switch blades 346—347, shown FIG. 23, and in the primary circuit of the transformer T, FIG. 30, for maintaining the rotation of turntable 3 and will simultaneously close blades 331—332, FIG. 23, and immediately thereafter open blade 333 from contact with blade 332 which will hold the circuit to the lift motor and de-energize the circuit to the magazine motor 35.

The closing of blades 331—332, FIG. 30, completes a circuit through the lift motor 210 through its switch blades 334—335 until cam 213 has rotated 180° at which time the selected record is now in playing contact with the tone arm 7 and the switch blades 334—335 will be opened to de-energize motor 210 by virtue of dwell in cam 213 on shaft 211, FIG. 23.

Upon completion of play of the record, the tone arm 7, shown FIG. 1, momentarily operates a sensitive switch assembly 8 which includes switch blades 336—337, FIG. 30, thus a momentary circuit is established to the lift motor 210 to begin the continued 180° rotation of shaft 211 for lowering the turntable.

The holding blades 334—335, now closed for the second time, will hold motor 210 energized until the cam 213 is returned to its initial position. During the downward movement of the turntable, the dwell in cam 213 will momentarily close switch blades 338—339, FIG. 30, to energize the record return relay 278, shown FIG. 26, whereupon the relay will temporarily remain energized by circuit through its holding blades 283—284 through the now closed blades 321—319 on the right transfer mechanism.

When the turntable mechanism reaches its home position, the blades 331—332—333 assume their normal position, as shown, which will complete a circuit through blades 31, 154, conductor 314, through the now closed relay blades 282—281, conductor 345 and the closed blades 324—325 to energize the right transfer motor 230 and its electro-magnet brake 238, thus initiating the return transfer of the record to the magazine. After a few degrees of rotation the right transfer cam 232, FIG. 25, its holding blades 322—323 will again hold the circuit through the transfer motor until it has completed its function, at which time the blades 322—323 will open and de-energize the right transfer motor and the electro-magnetic brake 238 which will precisely stop shaft 231 at its home position.

As the transfer cycle is completed blade 319 will shift from blade 321 to blade 320 and de-energize the circuit to "record return" relay 278 thus completing the play of the selected side A–1 of a selected record with all components in their normal rest positions.

To illustrate the playing of the opposite side of a record and under the assumption that an "even number" trip lever 36 is tripped, bearing the indicia A–2, shown FIG. 11, a circuit will be completed by pole 66 from conductor 309, FIG. 30, through terminal 140 and terminal 63 through "magazine" relay 257 in the same manner as in the case of the "odd number" selection. Thus the magazine and the memory rotor 33, shown FIG. 6, will begin rotation. When the brushes 70—71 on rotor 33 scan commutator segments 45 and 44, and brush 70 contacts the now energized segment A–2, a circuit will be established from conductor 309 through "left transfer" relay 271, shown FIG. 26, which will temporarily remain energized by virtue of holding blades 276—277 through the now closed blades 260—261 on the "magazine" relay 257.

The opening of blades 276 from blade 275 will de-energize index solenoid 27 for indexing and stopping the magazine with record in the left transfer zone for transfer to the turntable.

Blades 273—274 on "left transfer" relay will close and condition a circuit from conductor 314 to the left transfer motor 220 and the electro-magnet stop 227.

The now de-energized solenoid 27 will result in blade 31 shifting to blade 154 which will energize the "left transfer" mechanism, shown FIG. 24, which will transfer the record to the turntable with side A-2 uppermost for playing.

The continued operation of the "left transfer" mechanism and the "record raising" mechanism and their related switch blades are precisely the same in circuitry and operation as the previous description related to the playing of a "right hand" record side, namely A-1.

It is now apparent that the record player will automatically play any single selected side of the records in the magazine or any plurality of sides when corresponding levers 36 are tripped at spaced intervals or substantially at the same time.

*Selecting Circuits and Operation Thereof*

The electro-mechanical components of the selecting mechanism previously described in this one hundred selection embodiment of the invention is adapted for the multiple selection of both sides of fifty records responsive to the deposit of pluralities of coins of pre-determined different denominations.

The selecting circuitry including the assemblies illustraed in FIG. 1, namely coin mechanism 15, coin accumulator 16, multi-selector 14, selecting mechanism 12 and certain relays in junction 11 will be described in detail under a first assumption that the smallest unit-play coin is deposited and the "letter" and "number" dials of the multi-selector are rotated to index the play of a typical selected side of a record namely (B-1).

Since the entire selecting cycle is accomplished in less than one second, the sequence of operation will be described in appropriate sequences.

Referring to FIG. 31, which is a continuation of FIG. 30, the unit coin deposited in the coin mechanism 15 will momentarily close switch blades 348—349 and momentarily energize the credit coil 294 in the accumulator, shown FIG. 29, by completing a circuit from conductor 312 through blades 242—241 via conductor 350 to conductor 309 through the "value change switch" assembly 155 to be hereinafter described.

The resultant rotation of credit cam 301, FIG. 29, will close its switch blades 297—299 completing a partial circuit from conductor 312 via conductor 350 to contactor blade 384 of push button assembly 21 in the multi-selector.

The simultaneous break of blade 297 from blade 298 will de-energize a conventional coin "lock out" coil means 395 which will prevent the acceptance of additional coins in the coin device 15, FIG. 1.

The momentary closure of contactor blades 384—385 will energize the "multi-selector" relay 351 by completion of a direct current circuit from 312a to conductor 309. Relay 351 will close switch blades 352—353 to hold the relay energized. The closure of its blades 354—355 will complete a circuit to one side of "credit reset" relay 300 in the accumulator and the closure of its blades 356—357 and 358—359 will energize the "number" commutators in a "multi-selector" assembly through blades 303—304 and blades 389—390 respectively.

Simultaneous with the operation of relay 351 the "start" relay 240, shown FIG. 26, will be energized by virtue of the series circuit from conductor 309 through relay 351 via conductor 312a to main conductor 312.

Blade 242 of the "start" relay 240 will now shift from blade 241 to blade 243 and thus de-energize the push-button and coin responsive circuits for preventing further operation thereof until a later period. The now energized blade 243 of "start" relay 240 will energize both the "select letter" relay 247 and the "index" relay 111, shown FIGS. 17, 26 and 30, by circuit to conductor 309 through the now closed blades 252—253. The "index" relay will now withdraw pawl 112 from wheel 110 and maintain its blades 113—114 closed, shown FIG. 30.

The shift of blade 245 from blade 244 to blade 246, shown FIG. 30, on the "start" relay 240 will energize the selector gear motor 95 through the closed blades 113—114 of the "index" relay 111. The now open blade 244 of the "start" relay will de-energize conductor 308 running to any remote multi-selector 14 connected thereto. Thus the scanning rotation of the selector wheel 110 and disc 199 is begun and the operation of any remote connected multi-selectors is prevented until the selecting cycle is completed by virtue of the opening of main conductor 308 by blade 245 of "start" relay breaking from blade 244.

The now energized "select letter" relay 247 (time delayed when de-energized), will shift its blade 249 from blade 248 into contact with blade 250 thus completing a circuit to one side of "select number" relay 251.

Since the selection sought is B-1 and the two multi-selector dials are set accordingly the dual multi-contact "number" switches are set at (1) and (1—6) as shown and the dual multi-contact "letter" switches are set at (B—G) and (B) respectively and since the energized multi-selector relay 351 has closed its blades 358—359 a circuit is completed from main conductor 309 via conductor 392 through multi-selector contacts (1—6) through the coil 104 of the (1 to 5, A to E) relay to the main conductor 312 which relay will be energized and shift all its blades 180 through 184 from position shown including the closure of blades 173—174 which will complete a partial circuit from the other side of relay coil 251 via brush 161 to commutator 204.

When the nearest segment on the now rotating commutator 204 contacts brush (1—6) the "select number" relay 251 is energized via brush 118, blade 145 and conductor 370 running to the (1) contact in the "number" switch of multi-selector, via blades 304—303, and 356—357 to main 309.

The now energized "select number" relay 251 will close its holding blades 255—256 and shift its blade 253 from 252 to 254 and de-energize the "index" relay 111 which will permit its pawl to move against a number (1) abutment in any of the *a, b, c, d* and *e* groups on wheel 110. Simultaneously its blades 113—140, FIG. 30, will de-energize selecting motor 95 thus completing the "number" portion of the selection by registering the ten solenoids 115 with corresponding levers 36 bearing the numeral (1).

The energizing of the "select number" relay 251 will also de-energize the "select letter" relay 247. However, its blades will not open immediately because of the built-in time delay means. Immediately following the above-mentioned shift of contact blade 253 into contact with blade 254, the "change-over" relay 107 and the "credit reset" relay 300 are energized by circuits from main 309 to main 312.

The "change-over" relay now shifts blades 145, 147, 149, 151 and 153 from the brushes 118, 119, 120, 121 and 122 into contact with blades 184, 183, 182, 181 and 180 to set up the circuit for the "letter" selection.

The holding blades 142—143 of "change-over" relay now closed to hold the relay energized, the simultaneous shifting of "credit relay" 300 blades 303 to 388 and 389 to 391 completes a circuit from blade 391 through the multi-selector contact B via conductor 393 to hold the coil 104 of the (1 to 5, A to E) relay energized.

It is to be noted that each one of the segments 202 which are connected to each trip solenoid 15 will correspond to the "number" position of selections 1 to 5, inclusive.

The now energized "select number" relay 251 will have closed its holding blades 255—256 and shifted its blade 253 from 252 into contact with 254 which will de-energize "index relay" 111 and "select letter" relay 247.

The closure of blades 253 and 254 will simultaneously energize "change-over" relay 107 and "credit reset" relay 300.

The "change-over" relay 107 now transfers its blades 145 through 153 from the "number" finding brushes to blades 145, 147, 149, 151 and 153 of relay 104 for the subsequent findings of the selected "letter." The blades 143 of relay 107 also close with contact 142 for holding the relay energized.

The operation of the "credit reset" relay in the accumulator now transfers the "multi-selector" circuits from numbers to letters by means of the shift of its blades 303 and 389 from blades 304 and 390 into contact with blades 388 and 391 respectively. This operation also re-energizes the (1 to 5, A to E) relay 104 when the multi-selector is set for (A through E) circuits. This places its blades in contact with A—B—C—D—E brushes for final "letter" selection.

In approximately 0.10 second from the time the wheel 110 was registered by the "index" relay 111 the now de-energized time delayed "select letter" relay 247 shifts its blade 249 from 250 into contact with blade 248, and a circuit is completed from main 312 through brush 138 and slip-ring 201 on the disc 199 to one side of all solenoids 115.

Since brush 165 is conductive to an indexed solenoid 115 (third from the top, FIG. 31) and since said brush is positioned in predetermined fixed relation to a trip lever 36, numbered B-1, the said solenoid is energized by one of the five conductors connecting the multi-selector namely conductor 394, to operate the solenoid and trip the B-1 trip lever in the memory device, thus initiating the play of selection B-1 in the record player.

Simultaneous to the above, the shift of blade 249 to 250 opens the circuit energizing the "select number" relay 251.

In approximately 0.05 second from the time brush 18 made contact with the energized commutator segment 204 and the resultant opening of blade 253 from blade 252 the de-energized "index" relay, and the opening of its blades 113—114, FIG. 30, de-energized the selecting motor 95 which permitted the pawl 112 to move into engagement with the number (1) abutment on one of the five groups thereof on wheel 110. This operation completes the "number" portion of the selection and positions each of the ten selector solenoids 115 in register with ten trip levers 36 in the memory unit bearing the numeral (1).

It is also to be noted that each segment 202 and 203 on disc 199 are in contact with the corresponding five pairs of brushes bearing letters F—A, G—B, H—C, J—D, K—E, and that the solenoids connected to the segments are positioned to be selectively energized to trip selected trip levers 36 bearing the numeral (1) and all of the ten letters depending upon which conductor running to the multi-selector is completed through the latter.

Following a delay of approximately 0.15 second the now de-energized "select number" relay 251 opens breaking its holding blades 255—256 and shifting its blade 253 and 254 into contact with 252 which re-energizes "index" relay 111 and the "select letter" relay 247 which in turn closes the blades 113—114 to again energize the selecting motor 95 and to shift blade 249 to de-energize the circuit to solenoids 115.

The now rotating cam 97, shown FIG. 16, will engage one of its abutments with the operating arm 99 of switch assembly 98 and momentarily close blades 99—100 and momentarily open blades 101—102.

The opening of the latter blades will open the circuit to the "start" relay 240 and the "multi-selector" relay 351 which in turn will de-energize "index" relay, "change-over" relay 107, "select letter" relay 247, "credit reset" relay 300 and the (1 to 5, A to E) relay 104 when the latter is energized as was the case for selection B-1.

The momentary closure of blades 99—100 provide a momentary circuit to the selecting motor 95 for a sufficient period to permit the pawl 112 to rest on the outer rim of the wheel 110 with blades 113—114 in closed position for a subsequent selecting operation.

It is now apparent that when the dials of the multi-selector are set at any combination of letters A through E and numbers 1 through 5, the operation will be as above described for selection B-1 except that different brushes from the "number" group 118, 119, 120, 121 and 122 will energize corresponding brushes from the "letter" group 162, 163, 164, 165 and 166 following the operation of the "select number" relay 251.

It will also be apparent that when the multi-selector dials are set at any combination of letters of F through K numbers from 6 through 10, the operation will be the same as above described except that (1 to 5, A to E) relay 104 will not operate because of the open circuit through the single "letter" and single "number" multi-contact switches in the multi-selector. Hence the circuits from the "number" brushes 118 through 122 when changed over by the "change-over" relay 107 will complete circuits to the F, G, H, J and K brushes, shown as 128, 129, 130, 131 and 132. These brushes and their corresponding segments are positioned whereby when indexed and energized by a segment on commutator 205 the solenoids 115 will be positioned to trip any trip lever 36 in the memory device which corresponds to the setting of the letter and number combination on the multi-selector dials in the group 6 through 10 and F through K. It is to be noted that the commutator 204 remains de-energized during the operation of this latter group of selections.

It is now apparent that any selected record side will be played in the record player corresponding to each of the one hundred different settings of the multi-selector, through the selective positioning of the wheel 110 in moving through a maximum angle of 72° for first registering the ten solenoids with the selected "number" with all trip levers 36 and subsequently energizing the particular solenoid 115 already registered with a lever 36 identified by a prefix "letter" corresponding with the setting of the "letter" multi-contact switch in the muli-selector.

*Coin Controls*

The coin accumulator described in applicant's pending application, Serial No. 640,208, as illustrated in FIG. 27 is responsive to the deposit of coins of three dominations, namely, nickel, dime and quarter.

Referring to FIG. 31, the deposit of a nickel will momentarily energize the nickel switch 348—349 and establish a circuit from main 312 through the full line position of the "value" switch 155 and energize the one-play credit coil 294 connected to main 309.

This operation will rotate the accumulator cam (301) one segment and shift blade 297 from blade 298 into contact with blade 299 energizing a circuit running to the selector push button 21 which when operated will initiate the selecting mechanism.

The deposit of a dime will momentarily close dime switch 396—397 and through the full line position of "value" switch 155 will energize the two-play credit coil 295 for rotating the cam two segments.

The deposit of a quarter will momentarily close the quarter switch 398—399 and directly energize quarter credit coil 296 which will rotate the accumulator cam five segments. It is understood that the adjustment of a stop in the accumulator can be varied to provide 3 through 7 credits corresponding to the deposit of a quarter.

The restoring action of the accumulator occurs when its blade 297 is moved from blade 299 and closes into contact with blade 298 upon the energizing of the "credit reset" relay 300 which in turn returns the accumulator cam to its original position.

When both sections of the dual "value" switch 155 is manually shifted to its dotted line position a single play credit will require the deposit of a dime or two nickels and usually the accumulator cam stop is adjusted whereby the deposit of a quarter will provide a credit of three plays.

The deposit of a dime will now momentarily close the dime switch blades 396—397 and complete a circuit through the right-hand portion of "value" switch 155 through the one-play credit coil 294 as shown.

The deposit of a quarter will operate in exactly the same manner as previously described.

In order to provide for a single operation of the one-play credit coil 294 upon the deposit of two nickels the "dual-coin" relay 286 and 285 is operated as follows. The deposit of the first nickel will momentarily close the nickel switch 348—349 and through the dotted left portion of "value" switch 155 will complete a momentary circuit through blades 290—289 and momentarily energize reset coil 286, and at the extreme end of its armature movement blades 292—293 will momentarily close energizing the trip coil 285 which will result in blade 290 shifting from 289 into contact with blade 291 and the closure of blades 287—288. Note: the blades assume this position as a result of the unlatched position of the reset coil armature.

The deposit of the second nickel and the momentary closure of blades 348—349 will now complete a circuit through the one-play credit coil 294 which in turn will release the accumulator cam one segment and shift blade 297 from 298 into contact with blade 299 which will complete a circuit to the push button 21 for one play. Simultaneously a circuit from blade 299 will be completed through the now closed blades 287—288 through the reset coil 286 which will restore the relay to its normal inoperative position.

*Remote Control Multi-Selectors*

FIG. 32 illustrates one of any plurality of multi-selectors that may be remotely connected to the circuit previously described by means of the ten conductors shown. The operation of the remote connected multi-selector is identical to the operation of the multi-selector in the circuit previously described with the exception that the added blade switch 400 on the "multi-selector" relay normally resting in contact with blade 353 automatically opens a main circuit from conductor 308 to any other remote connected multi-selectors to prevent interfering operation between selectors. It is to be noted that only the right-hand portion of the "value" switch 155 is shown which limits this particular multi-selector to manual switching from one play for one dime to one play for one nickel and two plays for one dime.

It is now apparent that the objects of this invention have been fulfilled and that metallic circuits for one hundred selections may be completed to the memory device in the phonograph by ten conductors without the use of pulsing transmitters or receivers, with all the advantages of annunciator circuits but without the disadvantage of a full complement of conductors normally required in annunciator circuits.

It is further understood that the selecting system herein described is not limited to one hundred selections and that modifications or rearrangements of the circuits which result in the same operation are intended to come within the scope of the appended claims.

Having described my invention, I claim:

1. A combination record player and selecting system therefor comprising a mobile record magazine for retaining a predetermined number of disc records in equi-spaced facial relation, electric power drive and index means adapted to drive said magazine when energized and adapted to selectively stop and register each said record in either of two transfer planes when de-energized, a memory device for receiving and recording pre-selected pluralities of selections corresponding to either sides of said records and adapted to sequentially and selectively energize said drive and index means comprising a plurality of electric select switches in endless formation in said device corresponding to each side of said records with each opposite pair thereof corresponding to the upper sides of opposite disposed records in said magazine, each of said switches adapted to movement from an off position to a select position in contact with an electric commutator means for selectively energizing the latter when said switches are energized, said commutator means including an electro-magnetic restore means adapted to be driven by said magazine in timed relation therewith responsive to each of said switches for electrically sensing and registering said magazine in a position corresponding to each of said tripped select switches and restore each of said switches to its off position when said commutator and restore means are sequentially energized, a first electric driven record transfer means responsive to said commutator means adapted to transfer each of said records positioned in one said transfer zone to a playing zone with a predetermined side thereof uppermost for playing when energized, a second electric driven record transfer means responsive to said commutator adapted to transfer each of said records positioned in the other said transfer zone to said playing zone with the opposite predetermined said thereof uppermost for playing when energized, an electric driven turntable means and tone arm means for playing the uppermost side of each of said records transferred into said playing zone when energized, a selecting mechanism responsive to a remote connected multi-selector cooperatively positioned and related to said memory device comprising an electric driven rotary member and a first and a second electric commutator means, a number of select solenoids positioned in spaced relation on said rotor equally divisible into the said number of select switches, each of said solenoids positioned to scan and adapted to trip each of said select switches to said select position when rotated and registered therewith and energized, a second electric power drive and index means for driving said rotary member when energized and adapted to selectively stop and register said rotary member in a number of positions equal to the number of said select solenoids with latter registered with a corresponding group of said select switches, said first commutator means responsive to said multi-selector and adapted to energize said second drive and index means for positioning said rotary member and said solenoids in register with a pre-selected group of said selected switches when energized, a second commutator means responsive to said multi-selector for completing a circuit to and energizing a selected one of said solenoids corresponding to a pre-selected selection in said multi-selector when energized, a multiple electric relay means, a source of electric power, said multi-selector comprising a first and second manual multi-contact electric switch means and a manual electric contactor, a multiple circuit means inter-connecting all said electric elements including a plurality of selector conductors connecting both said multi-contact switches and said contactor for energizing said first and second commutator means, whereby the predetermined positioning of both said multi-contact switches in said multi-selector for a selection corresponding to one side of any one of said predetermined number of disc records and the manual operation of said electric contactor will energize all said electric elements in predetermined sequence and play said selected record side on said turntable means.

2. In a selective record player for selectively playing both sides of a pre-selected plurality of records, a mobile record magazine for retaining a predetermined number of like disc records in spacial spaced relation including a power means for driving same when energized, electric power drive and index means adapted to drive said magazine when energized and adapted to selectively stop and register each said record in either of two transfer planes when de-energized, a memory device adjacent said magazine adapted to temporarily record a variable number of pre-selected sides of said records to be played comprising a stator member and a rotor member with the latter coupled to said magazine and driven thereby in timed relation, a primary commutator means on said stator having a plurality of circular positioned equi-spaced alternate left and right primary segments thereon with each opposite pair thereof corresponding to opposite sides of opposite disposed records in said magazine, a primary conductor on said stator concentric to and spaced from said primary segments, a like plurality of electrically common select switch levers on said stator concentric to said segments and corresponding in number and position thereto, each of said levers movable from an off position to a tripped position into contact with said primary conductor and said corresponding one of said segments for energizing said conductor and said segment when said levers are energized, a left commutator on said stator comprising one-half said plurality of segments concentric to said primary commutator with each of said left segments in spaced relation to and corresponding with said left primary segments including a common left conductor connecting said segments, a right commutator on said stator comprising one-half said plurality of segments concentric to said left commutator with each of said right segments in spaced relation to and corresponding with said right primary segments including a common right conductor connecting said segments, a left-right conducting brush means on said rotor adapted to sequentially contact each said primary segments and alternately contact corresponding said left and right segments when said rotor is driven for electrically sensing the position of said magazine with respect to a tripped select lever, a left transfer relay means connected to said common left conductor and responsive therefor when the latter is energized adapted to de-energize the portion of said circuit means normally energizing said index means for permitting said index switch means to de-energize said power means and register said magazine with a selected record side in said right transfer plane, a right transfer relay means connected to said common right conductor responsive thereto when energized and adapted to de-energize said index means for permitting said index switch means to de-energize said power means and register said magazine with a selected record side in said right transfer plane, a magazine relay means responsive to said primary conductor when energized to energize said index means for permitting the latter to release said magazine and energizing said power means, a source of electric power, a main circuit means connecting said power means through said index switch means and connecting said magnetic index means through said left and right transfer relay means said magazine relay means said primary conductor and said source of power whereby the tripping of any one of said left or right select levers will drive said magazine and energize a corresponding one of said primary segments and register said magazine with the record side corresponding to said tripped select lever in either said left or said right transfer plane depending upon the hand of the said tripped select lever.

3. The construction recited in claim 2 including a left and a right restore solenoid means on said rotor member positioned to scan said select levers when said rotor is rotated and each said solenoid means adapted to engage and restore opposite disposed said levers from said tripped position to said off position when registered therewith by said magazine and alternately energized, an independent left and right brush and slip-ring means on said rotor and stator members respectively for completing independent circuits to each of said solenoid means when said corresponding slip-rings are energized, a left record transfer means adapted to transfer each of said records positioned in said left plane to a central zone and vice versa when sequentially energized for playing one side thereof including a left control switch means adapted for predetermined sequential operation, a right record transfer means adapted to transfer each of said records positioned in said right plane to a central zone and vice versa when sequentially energized for playing one side thereof including a right control switch means adapted for predetermined sequential operation, a turntable means adapted to raise from a rest position and lift and rotate each record transferred into said central zone to a play position into contact with said tone-arm means and vice versa when alternately energized including a turntable control switch means operated thereby at predetermined vertical positions thereof, a tone-arm means positioned above said turntable means adapted to play the upper side of each record on said turntable means including a cut-off switch means adapted to operate at the completion of play of each of said records, a transfer-play circuit means alternately responsive to the operation of said left or right transfer relay means interconnecting said main circuit means said left and right slip-ring means said left and right transfer means and their respective control switch means said turntable means and its said control switch means and said cut-off switch means whereby the operation of either of said transfer relays will energize a corresponding said transfer means to begin the transfer of a selected record from said transfer plane and the control switch means thereon will re-energize said relay means and re-energize said transfer means until said record is transferred into said zone whereby said switch means will energize said turntable means to begin its rise when the control switch means thereon will complete its rise to raise said record into playing contact with the selected side thereof and whereby said transfer control switch means will concurrent with said transfer energize a corresponding restore solenoid and restore said tripped select lever from its select to its off position and whereby the operation of said cut-off switch will re-energize said turntable means to initiate the return of said selected record to said magazine.

4. In a record player of the character described a rotary magazine means for retaining a predetermined plurality of disc records in equi-spaced facial relation, electric drive and index means adapted to rotate said magazine when energized and stop and selectively register same in any one of said plurality of positions with each selected one of said records positioned in a fixed transfer plane when de-energized, a magazine control device for temporarily recording pre-selected selections corresponding to said records comprising a fixed dielectric stator member and a rotor member with the latter adapted to be rotated in timed relation with said magazine, a circular primary conductor on said stator coaxial with said rotor, a said plurality of equi-spaced primary segments concentric with and spaced from said primary conductor, a like plurality of equi-spaced secondary segments on said stator concentric with and spaced from said primary segments including a common secondary conductor connected therewith, a pair of spaced slip-rings on said stator concentric with each other and said secondary segments, a primary brush means on said rotor adapted to sequentially and conductively bridge corresponding said primary and secondary segments when said rotor is rotated, a like plurality of electrically common select levers equi-spaced on said stator concentric with and corresponding to said primary segments and to said records in said magazine, each of said levers adapted to be tripped from an off position to a select position into bridging contact with said primary conductor and a corresponding one of said primary segments, a restore solenoid means on said rotor positioned to scan said levers when said rotor is rotated and adapted to coincide with each of said levers when said magazine is registered, said solenoid means adapted to restore any one of said levers registered therewith from its said tripped position to said off position when energized, restore brush means on said rotor in contact with said slip-rings and conductively connected to said solenoid means, an energized drive circuit means connecting said drive means said primary conductor and said select levers, an energized register circuit means including a relay means connecting said index means and said secondary conductor, a restore circuit connected to said slip-rings adapted to energize said restore solenoid means when energized whereby the tripping of any selected one of said select levers will close said drive circuit means and rotate said magazine and said rotor and bring said primary brush means into contact with an energized said primary segment and close said register circuit means to stop and register said magazine with a selected one of said records in said transfer plane and whereby the energizing of said restore circuit will restore said tripped lever and de-energize said drive and register circuits.

5. The construction recited in claim 4 including a record return commutator on said stator for momentarily energizing a return record circuit in said record player comprising a said plurality of equi-spaced return segments on said stator concentric with and spaced from said secondary segments including a common return conductor connecting said segments, a return brush means on said rotor for conductively bridging one of said slip-rings and said return segments for sequentially contacting said segments when said rotor is rotated, a return circuit means connected to said return conductor and said one slip-ring adapted to be completed when said brush means is resting on a return segment corresponding to the registered position of said magazine for initiating the return of a played record in said record player.

6. In a record player of the character described a rotary magazine means for retaining a predetermined plurality of disc records in equi-spaced facial relation, electric drive and index means adapted to rotate said magazine when energized and selectively register same with a pair of oppositely disposed records in said magazine in corresponding left and right transfer planes respectively when de-energized, a magazine control device for temporarily recording pre-selected selections corresponding to said records comprising a fixed dielectric stator member and a rotor member with the latter adapted to be rotated in timed relation with said magazine, a circular primary conductor on said stator coaxial with said rotor, a double said plurality of equi-spaced primary segments concentric with and spaced from said primary conductor, a said plurality of equi-spaced left secondary segments on said stator concentric with and spaced from and corresponding to alternate said primary segments including a common left secondary conductor connected therewith, a said plurality of equi-spaced right secondary segments on said stator concentric with and spaced from said left secondary segments and corresponding with said other alternate primary segments including a common right secondary conductor connected therewith, slip-rings means on said stator concentric with said secondary segments, a left brush means on said rotor adapted to sequentially and conductively bridge corresponding primary and left secondary segments when said rotor is rotated, a right brush means on said rotor adapted to sequentially and conductively bridge said primary and said right secondary segments when said rotor is rotated, a double said plurality of electrically common select levers equi-spaced on said stator concentric with and corresponding to said primary segments and opposite sides of said records in said magazine, each of said levers adapted to be tripped from an off position to a select position into bridging contact with said primary conductor and a corresponding one of said primary segments with each opposite pair of said levers corresponding to each opposite side of opposite disposed records in said magazine, a pair of opposite disposed restore solenoid means on said rotor positioned to scan said levers when said rotor is rotated and adapted to coincide with each pair of said opposite levers when registered, each said solenoid means adapted to restore each one of said levers registered therewith from its tripped position to said off position when energized, independent left and right restore brush and slip-ring means on said rotor conductively connected to each of said solenoid means, an energized drive circuit means connecting said drive means said primary conductor and said select levers, a left and a right energized register circuit means including independent relays means connecting said index means and said left and right secondary conductors, a left and a right restore circuit means independently connected to said left and right brush and slip-ring means adapted to be selectively and alternately energized whereby the selective tripping of either one of any pair of said oppositely disposed trip levers will close said drive circuit means and rotate said magazine and said rotor and bring either said left or said right brush means into contact with a corresponding said energized primary segment and close corresponding said registered circuit means to stop and register said magazine with a selected record side in either said left or said right transfer plane depending on the order of tripping of said select levers.

7. In a record player of the character described a selecting mechanism responsive to a remote connected multi-selector comprising a means forming a frame, a memory device having a predetermined number of equispaced select levers in circular formation about an axis corresponding to a like number of selections, said predetermined number of levers identified in equal groups with the levers therein numbered in a like numerical progression, all of said levers in each said group identified by a single prefix character and all groups identified by progressive different prefix characters, each pair of opposite positioned said levers adapted to initiate the play of said like numbered selections in opposite said groups in said memory device when tripped from an off to a select position, a rotor member journalled for rotation in said frame about said axis having a like said number of index abutments on a periphery thereof, an electric drive and index means adapted to rotate said rotor when energized and to stop and register same against each of said abutments in each one of a number of selected positions corresponding to like numbered positions of said select levers in each said group when de-energized, a number of select solenoids in equi-spaced radial relation on said rotor equal in number to the number of numbered said levers in each of said groups and positioned to scan said levers when said rotor is rotated, a source of electric power, a drive-register circuit means connected to said drive and index means and said source of power whereby said rotor member will rotate when said circuit means is energized and said rotor will be registered when said circuit means selectively de-energizes said index means with each of said solenoids in register with like numbered said levers in each said group with each one of said registered levers having a different said prefix character for completing the said numerical portion of a selected selection, a group commutator means on said rotor having a coaxial group slip-ring means conductively common to said solenoids and a said number of equi-spaced group segments concentric with said slip-ring means with each opposite pair of said segments conductively connected to a corresponding opposite pair of said solenoids, an independent solenoid slip-ring brush means in contact with said group slip-ring means for completing a common circuit to all said solenoids, independent solenoid brushes in equi-spaced relation on said stator corresponding in number to said group segments adapted to sequentially contact all of the latter when said rotor is rotated for selectively energizing each of said solenoids when each of said solenoid brushes is registered therewith and selectively and independently energized whereby each said opposite pair of said solenoids will selectively register with one half of each said select levers in each of said opposite groups thereof and each of said pair of solenoids will engage and trip a said select lever registered therewith when energized by a circuit connecting a corresponding said solenoid brush and said solenoid slip-ring, a pair of concentric primary commutators spaced concentric to said group commutator with each having alternate inter-spaced primary segments equal in number to one-half said solenoids and each of said segments positioned to correspond to each of said select levers of like numerical identification in each said group, a primary slip-ring conductively connecting each of said primary segments of each one of said primary commutators, an independent primary brush on said stator in contact with each of said primary commutators independently connected in said drive-register circuit means a number of equi-spaced primary brushes equal to one half the number of said solenoids on said stator positioned to be sequentially contacted by said primary segments when said rotor is rotated, a plurality of selector conductors corresponding in number to said primary brush means, a multiple change-over relay having each of its poles connected to each of said selector conductors and each of its normally closed contacts connected to each of said primary brushes and each of its normally open contacts conductively connected to a predetermined alternate half of said solenoid brushes when said relay means is de-energized and whereby said relay means will transfer the connections of said selector conductors from said primary brushes to said solenoid brushes when energized for completing the prefix portion of a selection and energizing a selected said solenoid and trip a corresponding selected trip lever when a circuit is completed through a corresponding one of said selector conductors and when said rotor is registered by a corresponding said primary brush in contact with one of said primary segments with a said primary brush first energized by said selected selector conductor.

8. A selecting mechanism of the character described responsive to a remote connected multi-selector comprising means forming a frame, a memory device for recording variable pluralities of selections including a circular formation of a predetermined number of groups of select levers, said levers equi-distant from a principal axis with each of said levers adapted to be tripped from an off to a select position, each of said groups identified by progressive prefix characters and the said levers in each of said groups identified by progressive numerals, a rotor means journalled for rotation in said frame about said axis in close proximity to said levers including a said number of spaced electro-magnets positioned to scan said levers when said rotor means is rotated and each opposite pair of said magnets adapted to trip any pair of oppositely positioned levers registered therewith when alternately energized, an electric power and index means on said frame associated with said rotor means for rotating same when energized and registering each said magnet with each said lever in each said group when de-energized, a stator means on said frame, a group-number commutator means on said rotor and said stator including a said number of group-number brushes for sequentially energizing said magnets when said rotor means is rotated and an independent common brush for completing a circuit common to all of said magnets for completing a combination prefix-numeral selection, a numeral commutator means on said rotor and said stator including one half said number of numeral brushes and a common brush adapted to sequentially complete circuits for the numeral portion of a selection in any of said groups and for initiating the said selective registering of said rotor means, a multi-pole transfer relay having one-half said number of poles with each one thereof connected to a selector conductor and each of its normally closed contacts connected to each of said numeral brushes, a like prefix relay having its poles connected to corresponding normally open contacts of said transfer relay and its alternate open and closed contacts connected to said group-numeral brushes corresponding to said opposite positioned magnets, a multi-selector means including a prefix switch means an independent numeral switch means having like contacts connected to said selector conductors including a contactor for initiating each selection, said prefix switch means including an alternate switch adapted to operate at predetermined positions of said prefix switch means, a source of electric energy, a combination main circuit means and multiple relay means connecting said source of power said multi-selector switch means said contactor said power and index means said common brushes said transfer relay said prefix relay whereby the manual selective setting of said numeral switch means corresponding to the numeral portion of a selected said lever and the setting of said prefix switch at a selected one of said predetermined positions corresponding to the prefix of said selected lever and the momentary closure of said contactor will energize said main circuit and relay means and said power means and a corresponding said numeral brush and whereby the resulting rotation of said rotor member will be stopped and registered by said numeral commutator means and position each of said magnets in register with each of said levers having like numeral identification and whereby the sequential operation of said main circuit and relay means will operate said transfer and said prefix relays and energize said group commutator to complete a final select circuit through said multi-selector to energize the said magnet registered with the said selected lever and trip same from its said off to its said select position.

9. A selecting mechanism of the character described responsive to a remote connected multi-selector comprising means forming a frame, a memory device for recording variable pluralities of selections including a circular formation of a predetermined number of groups of select levers, said levers equi-distant from a principal axis with each of said levers adapted to be tripped from an off to a select position, each of said groups identified by progressive prefix characters and the said levers in each of said groups identified by progressive numerals, a rotor means journalled for rotation in said frame about said axis in close proximity to said levers including a said number of spaced electro-magnets positioned to scan said levers when said rotor means is rotated and each opposite pair of said magnets adapated to trip any pair of oppositely positioned levers registered therewith when alternately energized, an electric power and index means on said frame associated with said rotor means for rotating same when energized and registering each said magnet with each said lever in each said group when de-energized, a stator means on said frame, a group-number commutator means on said rotor and said stator including a said number of group-number brushes for sequentially energizing said magnets when said rotor means is rotated and an independent common brush for completing a circuit common to all of said magnets for completing a combination prefix-numeral selection, a first numeral commutator means on said rotor and stator including one half said number of first numeral brushes including a first brush common thereto, a second numeral commutator means on said rotor and said stator including one-half said number of second numeral brushes and a second brush common thereto, each of said commutator means adapted to sequentially and alternately complete circuits for the numeral portion of said selection corresponding to oppositely positioned said select levers in opposite said groups and for initiating the said selective registering of said rotor means, a multi-pole transfer relay having one-half said number of poles with each one thereof connected to a selector conductor and each of its normally closed contacts connected to each of said numeral brushes, a multi-selector means including a prefix switch means and an independent numeral switch means having like contacts connected to said selector conductors including a contactor for initiating each selection, said numeral switch means including an alternate switch adapted to operate at predetermined positions of said numeral switch means, a source of electric energy, a combination main circuit and multiple relay means connecting said source of power said multi-selector switch means said contactor said power and index means said common brushes and said transfer relay whereby the manual selective setting of said prefix switch means to the prefix portion of a selected said lever and the setting of said numeral switch means at a selected one of said predetermined positions corresponding to the numeral portion of said selected lever and the momentary closure of said contactor will energize said main circuit and said relay means and said power means and whereby the said alternate switch will complete a circuit to a predetermined one of said first and second common brushes whereby the resulting rotation of said rotor member will be stopped and said member registered by said selected numeral commutator means to position each of said opposite magnets in register with opposite said levers having like numeral identification and whereby the sequential operation of said main circuit and relay means will operate said transfer relay and energize said group commutator means to complete a final select circuit through said multi-selector and energize the said magnet registered with said selected lever and trip same from its off to its said select position.

10. In a record player selecting mechanism of the character described means forming frame, a circular rotor member journalled for concentric rotation in said frame about a principal axis, a predetermined plurality of electric selecting solenoids on said member in annular equi-spaced relation and radial equi-spaced from said axis alternately identified as first and second solenoids, a selection device positioned adjacent said rotor member including a circular formation of equi-spaced levers equal to said plurality times said plurality in number with each said plurality thereof subtending an angle equal to the angles between the centers of each pair of said solenoids, each one of each pair of opposite levers responsive to operative movement of each one of each pair of opposite solenoids when the latter is registered therewith and energized, a commutator disc secured to said member for coaxial rotation therewith, a slip-ring means on said disc concentric to said axis conductively connected to one terminal of each said solenoids, one half said plurality of equi-spaced annular first segments on said disc spaced from and concentric to said slip-ring means with each of said segments conductively connected to alternate positioned first solenoids, one half said number of equi-spaced annular second segments on said disc spaced from and concentric to said first segments with each of said segments conductively connected to alternate positioned said second solenoids, a stator on said frame in parallel spaced relation to said disc, one half said plurality of independent first brush means on said stator in equi-spaced annular and radial relation to said axis positioned and adapted to be sequentially contacted by said first segments, one half said plurality of independent second brush means on said stator in equi-spaced annular and radial relation to said axis positioned alternate to said first brush means and adapted to be sequentially contacted by said second segments whereby the selective rotation of said rotor member through any one of said angles and the registration of said solenoids with corresponding said levers and the combination of momentary completion of selected energized circuits through said slip-ring means and alternately through each of said brush means will energize each of said corresponding solenoids and trip any selected one or a selected plurality of said trip levers.

11. The construction recited in claim 10 including an electric power means on said frame adapted to rotate said rotor member when energized, one half said plurality of groups of index abutments in equi-spaced annular relation on said member with a said plurality of said abutments in each of said groups, an electro-magnetic index means on said frame adapted to engage and disengage each of said abutments when de-energized and energized respectively for locking said member in a predetermined registered position when de-energized, an index switch operatively related to said index means adapted to de-energize said power means when said index means is de-energized, an index circuit means connected to said power means said index means and said index switch for rotating said rotor member when energized and selectively stopping and engaging a predetermined one of said abutments when de-energized and registering a pair of said opposite solenoids with a predetermined opposite pair of said levers.

12. The construction recited in claim 11 including a first register-numeral commutator on said disc concentric to said axis having one half said plurality of equi-spaced first segments conductively connected to a first slip-ring with each of said segments positioned in relation with and corresponding to said first solenoids, a second register-numeral commutator on said disc concentric to said axis having one half said plurality of equi-spaced second segments conductively connected to a second slip-ring with each of said segments alternately positioned between said first segments and corresponding to said second solenoids, first and second independent brush means on said stator member in contact with said first and second slip-rings respectively, one half said plurality of selector brushes on said stator in equi-spaced radial and annular position adapted to be sequentially contacted by said first and second segments when said rotor member is rotated whereby said selector brushes will be sequentially contacted by alternate said first and second circuits connecting said first and second independent brush means when a selected one of said brushes is energized and to position said solenoids with respect to said index abutments when said index circuit means is selectively energized by either of said first or second circuits.

13. In a selection system in a record player means forming a frame, a circular rotor member journalled for rotation in said frame about a principal axis, a predetermined plurality of electric solenoids on said member in annular equi-spaced relation and equi-spaced from said axis, each one of each pair of opposite positioned said solenoids identified as a first and a second solenoid, a selection recording device on said frame adjacent said rotor member including a coaxial circular formation of equi-spaced select levers equal in number to said plurality times said plurality identified in equal groups bearing different prefix characters with each group subtending an angle equal to the angle between the centers of the movable elements of each adjacent pair of said solenoids, the said levers in each said groups identified by progressive numerals with each said group further identified in equal first and second sub-groups, each one of each pair of opposite said levers responsive to the operation of oppositely positioned said first and second solenoids when the latter are registered therewith and energized, electric power and index means on said frame associated with said rotor member adapted to rotate same when energized and adapted to stop and register said rotor member with all said solenoids in register with like numeral levers in each said group when selectively de-energized, a register-relay and circuit means connecting said power and index means for stopping and registering said rotor means when energized, a first commutator means positioned on said rotor in predetermined timed relation to said solenoids arranged and adapted ot energize said register-relay circuit means with any opposite pair of said first and second solenoids in register with a selected opposite pair of said levers in any one of said first sub-groups when said first commutator means is selectively energized, a second commutator means positioned on said rotor in predetermined alternate timed relation to said solenoids arranged and adapted to energize said register-relay circuit means with any opposite pair of said first and second solenoids in register with a selected opposite pair of said levers in any one of said second sub-groups when said second commutator means is selectively energized, a source of electric energy, a multi-selector means conductively connected to said source of energy said register circuit and said first and and second commutator means for selectively rotating and registering said rotor member to a position with any of said opposite pair of said solenoids registered with a selected pair of opposite select levers in any of said group when operated.

14. The construction recited in claim 13 including a third commutator means independently connecting said solenoids and adapted to provide an independent conducting circuit to each said first and second solenoids when selectively rotated and registered with all of the selected numeral identified said levers, one half said plurality of selector conductors connected to said multi-selector for selectively energizing any one of said solenoids when operated, a transfer relay having contact means adapted to shift said selector conductors from said first solenoids to said second solenoids through each of corresponding said conducting circuits in said commutator when energized, a circuit-relay means connecting said source of power, said transfer relay and said multi-selector whereby the selective operation of the latter will energize either a said first or a said second solenoid to operate a selected said select lever in a selected said group corresponding to the position of said multi-selector when operated.

15. In a selective record player a memory device comprising a formation of a plurality of paramagnetic select levers identified in a predetermined number of equal circumferential prefix groups with a like number of said levers in each of said group numbered in corresponding like numerical progression, each of said levers corresponding to each selection in said player each of said levers carrying a pole member movable to complete a circuit to initiate the play of corresponding selections when moved from a rest to a tripped position, a rotor member journaled for rotation in coaxial relation to said levers including thereon a circular formation of equi-spaced electric solenoids corresponding in number and position to said groups for scanning said levers when rotated, power means for rotating said rotor when energised, electromechanical means for selectively stopping and registering said rotor with each of said solenoids in register with each of said levers of said like numerical number when operated, electric commutator means coupled to said rotor member for rotation thereby including separate circuit means connected to each of said solenoids and said electromechanical means for selectively operating said electromechanical means to thereby selectively energize each of said solenoids when selectively operated, a multi-contact numeral switch having separate circuit positions corresponding in number and position to each of the like numbered levers in each of said prefix groups for selectively operating said rotor, a multi-contact prefix switch having separate circuit positions corresponding in number and position to each of said prefix groups for selectively energizing each of said solenoids in each selected said prefix group when said rotor is registered, a circuit closing contactor, a source of electric power, electric circuit and relay means connected to said separate circuit means, said numeral switch, said prefix switch, said contactor and said source of power whereby the selective setting of each said switch to any selected one of said circuit positions will sequentially rotate said rotor and register same with each of said solenoids registered with each said lever numerically corresponding with the setting of said numeral switch and energize the selected one of said solenoids positioned in the said prefix group corresponding to the setting of said numeral switch and move the said lever registered therewith to its tripped position when said contactor is operated for initiating the play of a selected selection in said player.

References Cited in the file of this patent

UNITED STATES PATENTS

| | | |
|---|---|---|
| 2,319,788 | Bryan et al. | May 25, 1943 |
| 2,346,311 | Johnson | Apr. 11, 1944 |
| 2,348,519 | Bolley | May 9, 1944 |
| 2,371,491 | Wright | Mar. 13, 1945 |
| 2,382,488 | Kenney et al. | Aug. 14, 1945 |
| 2,398,067 | Winkler | Apr. 9, 1946 |
| 2,416,436 | Eakins | Feb. 25, 1947 |
| 2,624,795 | Bodoh | Jan. 6, 1953 |